US010021451B2

(12) United States Patent
Lee et al.

(10) Patent No.: US 10,021,451 B2
(45) Date of Patent: Jul. 10, 2018

(54) METHOD FOR OUTPUTTING AUDIO AND ELECTRONIC DEVICE FOR THE SAME

(71) Applicant: Samsung Electronics Co., Ltd., Suwon-si, Gyeonggi-do (KR)

(72) Inventors: Ki-Man Lee, Suwon-si (KR); Mi-Sun Kim, Seoul (KR); Sang-Hun Kim, Yongin-si (KR); Hyun-Joong Kim, Suwon-si (KR); Mi-Ra Seo, Yongin-si (KR); Woo-Cheol Jung, Seoul (KR); Yong-Gu Lee, Guri-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/056,204

(22) Filed: Feb. 29, 2016

(65) Prior Publication Data

US 2016/0255398 A1 Sep. 1, 2016

(30) Foreign Application Priority Data

Feb. 27, 2015 (KR) ........................ 10-2015-0028644

(51) Int. Cl.
*H04N 21/41* (2011.01)
*H04N 21/4363* (2011.01)
(Continued)

(52) U.S. Cl.
CPC ........... *H04N 21/4394* (2013.01); *G06F 3/16* (2013.01); *H04L 65/00* (2013.01);
(Continued)

(58) Field of Classification Search
CPC ........... H04N 21/4394; H04N 21/4126; H04N 21/43637; H04N 21/4766; H04N 21/6131;
(Continued)

(56) References Cited

U.S. PATENT DOCUMENTS

2007/0233905 A1 10/2007 Hatano et al.
2010/0150383 A1* 6/2010 Sampat .................... H04R 1/10
381/311
(Continued)

FOREIGN PATENT DOCUMENTS

JP 2009-111637 A 5/2009
KR 10-2007-0068841 A 7/2007

OTHER PUBLICATIONS

EngineersGarage, Difference between Bluetooth and WiFi, Jan. 2015 https://|web.archive.org|web/20150103171452/http:/|www.engineersgarage.com/contribution/difference-between-bluetooth-and-wifi.*

*Primary Examiner* — James Yang
(74) *Attorney, Agent, or Firm* — Jefferson IP Law, LLP

(57) ABSTRACT

A method for communicating data by an electronic device is provided. The method includes transmitting a signal including audio/video (A/V) data to a first external electronic device through a first communication module, while connected with the first external electronic device, generating data or a signal unrelated to the A/V data or receiving the data or signal unrelated to the A/V data from an external electronic device other than the first external electronic device, and providing an audio or a video through a display or an embedded sound device based on at least a portion of the data or the signal unrelated to the A/V data or transmitting the at least a portion of the data or the signal unrelated to the A/V data to a second external electronic device through a second communication module.

11 Claims, 18 Drawing Sheets

(51) Int. Cl.
  *H04N 21/439* (2011.01)
  *H04N 21/4788* (2011.01)
  *H04N 21/61* (2011.01)
  *G06F 3/16* (2006.01)
  *H04N 21/81* (2011.01)
  *H04L 29/06* (2006.01)

(52) U.S. Cl.
  CPC ... *H04N 21/4126* (2013.01); *H04N 21/43637* (2013.01); *H04N 21/4788* (2013.01); *H04N 21/6131* (2013.01); *H04N 21/8106* (2013.01)

(58) Field of Classification Search
  CPC ......... G06F 3/16; H04W 92/18; H04W 88/06; H04W 76/025; H04W 76/04; H04R 2420/07; H04R 5/033; H04R 1/10; H04L 69/325; H04B 1/38
  See application file for complete search history.

(56) References Cited

U.S. PATENT DOCUMENTS

| | | | |
|---|---|---|---|
| 2014/0105198 A1* | 4/2014 | Banerjea | H04W 76/025 370/338 |
| 2016/0095157 A1* | 3/2016 | Wenzel | H04W 76/04 370/329 |

* cited by examiner

| APPLICATION | PRIORITY | OUTPUT DEVICE |
|---|---|---|
| CALL | FIRST | BLUETOOTH SPEAKER |
| | SECOND | EARPHONE |
| | THIRD | USB AUDIO DEVICE |
| | FOURTH | EMBEDDED SPEAKER |
| NOTIFICATION/ALARM | FIRST | EARPHONE |
| | SECOND | BLUETOOTH SPEAKER |
| | THIRD | USB/HDMI AUDIO DEVICE |
| | FOURTH | EMBEDDED SPEAKER (SIMULTANEOUSLY SOUNDING) |
| SYSTEM | FIRST | EARPHONE |
| | SECOND | USB/HDMI AUDIO DEVICE |
| | THIRD | BLUETOOTH SPEAKER |
| | FOURTH | EMBEDDED SPEAKER |
| ... | ... | ... |

FIG.14A

| OUTPUT DEVICE | PRIORITY | APPLICATION |
|---|---|---|
| BLUETOOTH SPEAKER | FIRST | MUSIC/VIDEO |
| | SECOND | CALL |
| | THIRD | NOTIFICATION/ALARM |
| | FOURTH | SYSTEM |
| EARPHONE | FIRST | CALL |
| | SECOND | MUSIC/VIDEO |
| | THIRD | NOTIFICATION/ALARM |
| | FOURTH | SYSTEM |
| USB/HDMI AUDIO DEVICE | FIRST | MUSIC/VIDEO |
| | SECOND | CALL |
| | THIRD | NOTIFICATION/ALARM |
| | FOURTH | SYSTEM |
| EMBEDDED SPEAKER | FIRST | CALL |
| | SECOND | NOTIFICATION/ALARM |
| | THIRD | MUSIC/VIDEO |
| | FOURTH | SYSTEM |
| ... | ... | ... |

| SOUND QUALITY LEVEL | PRIORITY | OUTPUT DEVICE |
| --- | --- | --- |
| LV 5 | FIRST | BLUETOOTH SPEAKER |
| | SECOND | USB/HDMI AUDIO DEVICE |
| | THIRD | EARPHONE |
| | FOURTH | EMBEDDED SPEAKER |
| LV 4 | FIRST | EARPHONE |
| | SECOND | BLUETOOTH SPEAKER |
| | THIRD | USB/HDMI AUDIO DEVICE |
| | FOURTH | EMBEDDED SPEAKER |
| LV 3 | FIRST | USB/HDMI AUDIO DEVICE |
| | SECOND | EARPHONE |
| | THIRD | BLUETOOTH SPEAKER |
| | FOURTH | EMBEDDED SPEAKER |
| LV 2 | FIRST | EMBEDDED SPEAKER |
| | SECOND | EARPHONE |
| | THIRD | USB/HDMI AUDIO DEVICE |
| | FOURTH | BLUETOOTH SPEAKER |
| ... | ... | ... |

| AUDIO GENRE | PRIORITY | OUTPUT DEVICE |
|---|---|---|
| CLASSICAL | FIRST | BLUETOOTH SPEAKER |
|  | SECOND | USB/HDMI AUDIO DEVICE |
|  | THIRD | EARPHONE |
|  | FOURTH | EMBEDDED SPEAKER |
| ROCK | FIRST | EARPHONE |
|  | SECOND | BLUETOOTH SPEAKER |
|  | THIRD | USB/HDMI AUDIO DEVICE |
|  | FOURTH | EMBEDDED SPEAKER |
| DANCE | FIRST | USB/HDMI AUDIO DEVICE |
|  | SECOND | EARPHONE |
|  | THIRD | BLUETOOTH SPEAKER |
|  | FOURTH | EMBEDDED SPEAKER |
| BALLAD | FIRST | EARPHONE |
|  | SECOND | EMBEDDED SPEAKER |
|  | THIRD | USB/HDMI AUDIO DEVICE |
|  | FOURTH | BLUETOOTH SPEAKER |
| ... | ... | ... |

FIG.14D

| APPLICATION | PRIORITY | OUTPUT DEVICE |
|---|---|---|
| MUSIC | FIRST | BLUETOOTH SPEAKER |
| | SECOND | EARPHONE |
| | THIRD | USB AUDIO DEVICE |
| | FOURTH | EMBEDDED SPEAKER |
| VIDEO | FIRST | EARPHONE |
| | SECOND | BLUETOOTH SPEAKER |
| | THIRD | USB/HDMI AUDIO DEVICE |
| | FOURTH | EMBEDDED SPEAKER (SIMULTANEOUSLY SOUNDING) |
| GAME | FIRST | EARPHONE |
| | SECOND | USB/HDMI AUDIO DEVICE |
| | THIRD | BLUETOOTH SPEAKER |
| | FOURTH | EMBEDDED SPEAKER |
| ... | ... | ... |

FIG.14E

METHOD FOR OUTPUTTING AUDIO AND ELECTRONIC DEVICE FOR THE SAME

CROSS-REFERENCE TO RELATED APPLICATION(S)

This application claims the benefit under 35 U.S.C. § 119(a) of a Korean patent application filed on Feb. 27, 2015 in the Korean Intellectual Property Office and assigned Serial number 10-2015-0028644, the entire disclosure of which is hereby incorporated by reference.

TECHNICAL FIELD

The present disclosure relates to electronic devices outputting audio. More particularly, the present disclosure relates to an electronic device and a method for adjusting the output path of audio for output through an audio output device included in the electronic device or an audio output device functionally connected with the electronic device.

BACKGROUND

A portable terminal as recently released is connected with an external audio device to output audio data for output from the portable terminal through the external audio device. For example, when the user runs a media playback function of the portable terminal with the external audio device in connection, media reproducible sounds may be output through the external audio device.

When media are played with the external audio device in connection, audio data output from the portable terminal may be output through the external audio device. For example, when the portable terminal receives a call while playing the media, not only the media playback sounds but also the call sound may be routed and output to the external audio device. In such case, since the media playback sounds and the call sound are simultaneously output through the external audio device, the user may be annoyed with enjoying the media and talking on the phone.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for adjusting the output path of audio for output through an audio output device included in the electronic device or an audio output device functionally connected with the electronic device.

In accordance with an aspect of the present disclosure, an electronic device is provided. The electronic device includes a first communication module using a first communication protocol, a second communication module using a second communication protocol, a display, an embedded sound device, a processor electrically connected with the first communication module, the second communication module, the display, and the embedded sound device, and a memory electrically connected with the processor, wherein the memory is configured to store instructions executed to configure the processor to transmit a signal including audio/video (A/V) data to a first external electronic device through the first communication module, while connected with the first external electronic device, generate data or a signal unrelated to the A/V data or receive the data or the signal unrelated to the A/V data from an external electronic device other than the first external electronic device, and provide an audio or a video through the display or the embedded sound device based on at least a portion of the data or the signal unrelated to the A/V data or transmit the at least a portion of the data or the signal unrelated to the A/V data to a second external electronic device through the second communication module.

In accordance with another aspect of the present disclosure, a method for communicating data by an electronic device is provided. The method includes transmitting a signal including A/V data to a first external electronic device through a first communication module, while connected with the first external electronic device, generating data or a signal unrelated to the A/V data or receiving the data or the signal unrelated to the A/V data from an external electronic device other than the first external electronic device, and providing an audio or a video through a display or an embedded sound device based on at least a portion of the data or the signal unrelated to the A/V data or transmitting the at least a portion of the data or the signal unrelated to the A/V data to a second external electronic device through a second communication module.

In accordance with another aspect of the present disclosure, an electronic device is provided. The electronic device includes a first communication module using a first communication protocol providing at least one communication path, a second communication module using a second communication protocol, a display, an embedded sound device, a processor electrically connected with the first communication module, the second communication module, the display, and the embedded sound device, and a memory electrically connected with the processor, wherein the memory is configured to store instructions executed to configure the processor to connect to a first external electronic device to transmit a signal including A/V data to a first communication path through the first communication module, while connected with the first external electronic device, generate data or a signal unrelated to the A/V data or receive the data or the signal unrelated to the A/V data from an external electronic device other than the first external electronic device, and provide an audio or a video through the display or the embedded sound device to a user based on at least a portion of the data or the signal unrelated to the A/V data or transmit the at least a portion of the data or the signal unrelated to the A/V data to a second external electronic device through a second communication path of the first communication module.

In accordance with another aspect of the present disclosure, a method for communicating data by an electronic device is provided. The method includes connecting to a first external electronic device to transmit a signal including A/V data to a first communication path through a first communication module, while connected with the first external electronic device, generating data or a signal unrelated to the A/V data or receiving the data or the signal unrelated to the A/V data from an external electronic device other than the first external electronic device, and providing an audio or a video through a display or an embedded sound device to a user based on at least a portion of the data or the signal related to the A/V data or transmitting the at least a portion of the data or the signal related to the A/V data to a second external electronic device through a second communication path.

In accordance with another aspect of the present disclosure, a machine-readable storage medium recording a program to execute a method for communicating data by an electronic device is provided. The method includes transmitting a signal including A/V data to a first external electronic device through a first communication module, while connected with the first external electronic device, generating data or a signal unrelated to the A/V data or receiving the data or the signal unrelated to the A/V data from an external electronic device other than the first external electronic device, and providing the audio or the video through a display or an embedded sound device based on at least a portion of the data or the signal unrelated to the A/V data or transmitting the at least a portion of the data or the signal unrelated to the A/V data to a second external electronic device through a second communication module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 14A, 14B, 14C, 14D, and 14E illustrate audio-related information according to various embodiments of the present disclosure.

Throughout the drawings, like reference numerals will be understood to refer to like parts, components, and structures.

DETAILED DESCRIPTION

Figure 1:
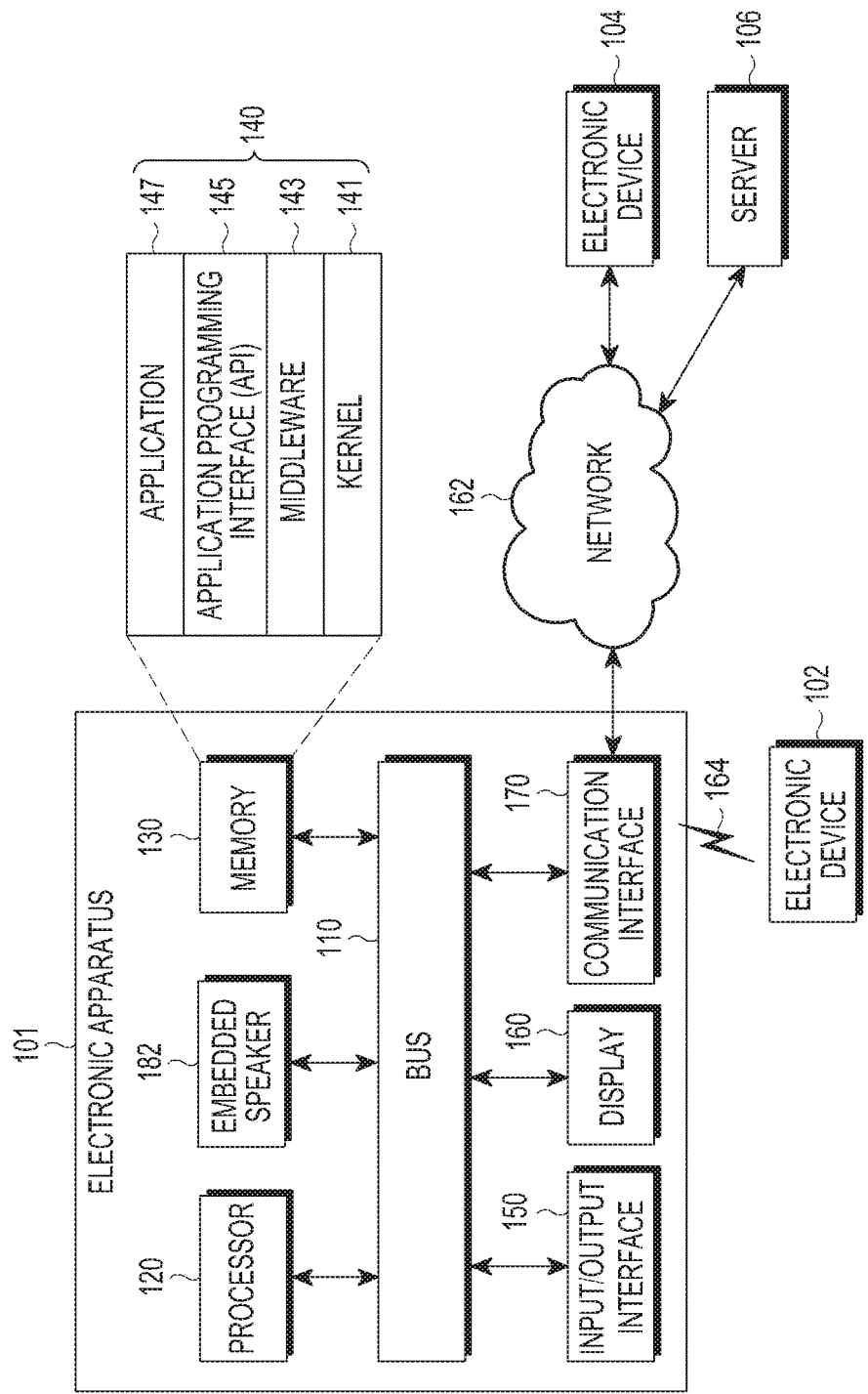
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the terms "have," "may have," "include," or "may include" a feature (e.g., a number, function, operation, or a component, such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, the home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (e.g., a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may be at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1 illustrates a network environment including an electronic device according to an embodiment of the present disclosure.

Referring to FIG. 1, according to an embodiment of the present disclosure, an electronic device 101 is included in a network environment.

The electronic device 101 may include at least one of a bus 110, a processor 120, a memory 130, an input/output interface 150, a display 160, a communication interface 170, and an embedded speaker 182. In some embodiments of the present disclosure, the electronic device 101 may exclude at least one of the components or may add another component.

The bus 110 may include a circuit for connecting the components 120, 130, 150 to 170, and 182 with one another and transferring communications (e.g., control messages and/or data) between the components.

The processor 120 may include one or more of a CPU, an AP, or a communication processor (CP). The processor 120 may perform control on at least one of the other components of the electronic device 101, and/or perform an operation or data processing relating to communication.

The processor 120 may control whether to output through the speaker 182. The processor 120 may control the electronic device 101 so that various audio data generated by the electronic device 101 are output through the embedded speaker 182.

According to an embodiment of the present disclosure, the processor 120 may determine whether an external audio device (e.g., a first external electronic device 102) is connected with the electronic device 101. When the external audio device is in connection, the processor 120 may control the electronic device 101 so that various types of audio generated by the electronic device 101 are output through the external audio device.

According to an embodiment of the present disclosure, the processor 120 may control the electronic device 101 so that various types of audio are output through one or more devices (e.g., the embedded speaker 182) previously equipped in the electronic device 101 even when the external audio device is connected with the electronic device 101.

According to an embodiment of the present disclosure, the processor 120, upon connection of the external audio device, may control the electronic device 101 so that audio is output through the internal device (e.g., the embedded speaker 182) or the external audio device. The processor 120 may control the electronic device 101 so that the same audio is output simultaneously through the internal device (e.g., the embedded speaker 182) or the external audio device or may control the electronic device 101 so that different types of audio are output through different output devices.

According to an embodiment of the present disclosure, the processor 120 may adjust the output path of the audio. For example, it is assumed that two or more different types of audio are simultaneously output by the electronic device 101. The processor 120 may determine different destinations for outputting the different types of audio, i.e., output paths or output devices. For example, it may be assumed that a media playback sound and a call sound have been simultaneously generated by the electronic device 101 or simultaneous occurrence of a media playback event and a call event has been detected by the electronic device 101. The processor 120 may control the electronic device 101 so that the media playback sound is output through the external audio device (e.g., an external speaker, earphone, headphone, or headset) electronically connected with the electronic device 101 and the call sound is output through one or more devices (e.g., the embedded speaker 182) previously provided in the electronic device 101.

According to an embodiment of the present disclosure, the processor 120 may determine an output device of audio corresponding to an application run on the electronic device 101 according to an attribute of the application. Here, the attribute of the application includes the name of the application, priority of the output device favored by the application, and the category where the application belongs. According to an embodiment of the present disclosure, the processor 120 may identify at least part of information associated with a corresponding application when the application is installed or run on the electronic device 101 as attribute information indicating the attribute of each application. According to an embodiment of the present disclosure, the processor 120 may determine the attribute of each application run on the electronic device 101. For example, when the application relates to music, the processor 120 may determine that the application is a music-related application based on a music file (e.g., an MP3 file) associated with the application.

According to an embodiment of the present disclosure, the output device of the audio generated from the application may be determined according to the category (e.g., game, traffic, weather, news, communication, or music) where the application belongs. For example, when the category of the application is music, the processor 120 may determine that the output device of the audio is a Bluetooth speaker. For example, when the category where the application belongs is communication, the processor 120 may determine that the output device of the audio is an earphone.

According to an embodiment of the present disclosure, when the electronic device is a driving mode, e.g., while the user is driving a car or moving in a car, the electronic device 101 may be electrically connected with a speaker of the car. The speaker of the car, as the external audio device, may output audio generated from the electronic device 101. The processor 120 may control the electronic device 101 so that the audio generated by a navigation-related application belonging to the traffic category is output through the speaker of the car. Further, when a phone talk occurs to the electronic device 101 running a navigation function, the processor 120 may control the electronic device 101 so that audio related to the phone talk is output through an internal device, e.g., the embedded speaker 182, of the electronic device 101 rather than the speaker of the car.

According to an embodiment of the present disclosure, the processor 120 may determine an audio output device based on an operation mode of the electronic device 101. For example, when a notification related to a game-related application, which has nothing to do with the traffic category, is generated, the processor 120 may control the electronic device 101 so that a sound according to the notification (e.g., a notification sound or a sound effect) is output through an internal device, e.g., the embedded speaker 182, of the electronic device 101.

According to an embodiment of the present disclosure, the processor 120 may determine an application generating audio output from the corresponding output device according to the priority of each application of the output device. For example, the top priority application of the Bluetooth speaker, which is the external audio device, may be an application belonging to the music category. Accordingly, when an application (e.g., a media player) belonging to the music category runs, the audio of the application may be output through the Bluetooth speaker.

The priority of the output device may be preset per application or may be determined by the processor 120 depending on the type of audio output through the output device or the user's preference. For example, a phone-related application may have the embedded speaker 182 preset as the audio output device. For example, the electronic device 101 may have output audio generated by the music-related application most through the external audio device (e.g., the Bluetooth speaker) according to the user's input. The processor 120 may determine that the external audio device has the top priority of the output path or output device of the audio by the music-related application according to the user's preference. Thereafter, whenever the music-related application runs, the processor 120 may control the electronic device 101 so that the audio corresponding to the music-related application is first output through the external audio device corresponding to the top priority.

According to an embodiment of the present disclosure, the electronic device 101 may have an application for headsets (e.g., an application for level over headsets) or an application for Bluetooth speakers (e.g., Level Box) installed. The processor 120 may determine whether to be able to separately manage one or more types of audio, e.g., whether to support a split sound service, through the application for headsets or application for Bluetooth. The processor 120 may determine a set value for whether to support the split sound service and provide the split sound service to the user through the headset or Bluetooth speaker.

According to an embodiment of the present disclosure, when the electronic device 101 supports the split sound service and the electronic device 101 is connected with the Bluetooth speaker (e.g., Level Box), the processor 120 may control the electronic device 101 to provide the user with a menu for turning on/off the split sound service provided through the Bluetooth speaker. Here, the processor 120 may authenticate the Bluetooth speaker (e.g., Level Box) through, e.g., a unique identification number (ID) assigned to the Bluetooth speaker.

According to an embodiment of the present disclosure, the processor 120 may distinguish the Bluetooth speaker from the headset using Bluetooth class of device (CoD). The processor 120 may support functions of the output device according to a format value applicable to each of the Bluetooth speaker and the headset.

Generally, a Bluetooth device has a synchronous connection oriented (SCO) profile used for calling functions and an advanced audio distribution (A2DP) profile used for playing media. According to an embodiment of the present disclosure, when the SCO profile of the Bluetooth device is not supported by the electronic device 101, the electronic device 101 may utilize the Bluetooth device only for playing media. According to an embodiment of the present disclosure, when the SCO profile is set not to be used by the electronic device 101 although the SCO profile of the Bluetooth device is supported for the electronic device 101, the operation according to the call-related event may be done only on the electronic device 101, and the electronic device 101 may provide the split sound service to the user through the Bluetooth device.

According to an embodiment of the present disclosure, the communication interface 170 may include a first communication module using a first communication protocol and a second communication module using a second communication protocol. The processor 120 may manage the respective output paths of audios using the respective communication protocols. The first communication module and the second communication module each may individually generate two or more paths under the control of the processor 120. The processor 120 may control the electronic device 101 so that audios or videos are output through the two or more paths. For example, a first audio may be transferred to a first output device by the first communication protocol used by the first communication module to be output through the first output device. Likewise, a second audio may be transferred to a second output device by the first communication protocol used by the first communication module to be output through the second output device. A first video may be transferred to a third output device by the first communication protocol used by the first communication module to be output through the third output device. A third audio may be transferred to the second output device by the second communication protocol to be output through the second output device, and a second video may be transferred to a fourth output device by the second communication protocol to be output through the fourth output device. Here, the first to fourth output devices may be at least one of an embedded sound device (e.g., the embedded speaker 182) in the electronic device 101, an embedded display device (e.g., the display 160), an external audio output device (e.g., a Bluetooth speaker) functionally connected with the electronic device 101, or an external video output device (e.g., a TV).

The memory 130 may include a volatile and/or nonvolatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

According to an embodiment of the present disclosure, the memory 130 may store an output device list. The output device list may be, e.g., a record where each of one or more applications corresponds to one or more output devices able to output audios by each of the one or more applications. Further, the output device list may be, e.g., a record of each of one or more audio output devices and one or more applications corresponding to audios for output by each of the one or more audio output devices. The processor 120 may determine output devices of audios respectively corresponding to applications based on the output device list stored in the memory 130.

For example, the kernel 141 may control or manage system resources (e.g., the bus 110, the processor 120, or the memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, the processor 120, or the memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for file control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

According to an embodiment of the present disclosure, the input/output interface 150 may receive a user input for determining the respective output devices of audios generated by applications running on the electronic device 101. The processor 120 may also determine an output device to output audio according to the user input.

The display 160 may include, e.g., a liquid crystal display (LCD), a light emitting diode (LED) display, an organic LED (OLED) display, a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

The display 160 may simultaneously display one or more items (e.g., execution screens where two or more applications 147 are running) on a single overall screen.

The communication interface 170 may set up communication between the electronic device 101 and an external device (e.g., the first external electronic device 102, a second external electronic device 104, or a server 106). For example, the communication interface 170 may be connected with a network 162 through wireless communication or wired communication and may communicate with an external device (e.g., the second external electronic device 104, the server 106, and the like).

According to an embodiment of the present disclosure, the first external electronic device 102 may be an external audio device. The communication interface 170 may enable audio to be output from the first external electronic device 102 by transferring the audio to the first external electronic device 102 under the control of the processor 120. For example, it is assumed that the first external electronic device 102 is a Bluetooth speaker. The communication interface 170 may transfer the audio of the application running on the electronic device 101 to the first external electronic device 102 through Bluetooth communication.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth, near-field communication (NFC), or GNSS. The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used.

According to an embodiment of the present disclosure, the short-range communication may include an accessory communication protocol, an example of which is disclosed in U.S. Patent Application Publication No. 2014/0351446. The overall disclosure of U.S. Patent Application Publication No. 2014/0351446 incorporated herein, and all of the operations described herein may be executed based on the whole disclosure described in U.S. Patent Application Publication No. 2014/0351446.

The wired connection may include at least one of universal serial bus (USB), high definition multimedia interface (HDMI), recommended standard 232 (RS-232), or plain old telephone service (POTS). The network 162 may include at least one of telecommunication networks, e.g., a computer network (e.g., local area network (LAN) or wide area network (WAN)), Internet, or a telephone network.

The embedded speaker 182 may be a speaker implemented in the form of being included in the electronic device 101. The embedded speaker 182 may output audio stored in the memory 130 of the electronic device 101 or audio stored in any one of the first external electronic device 102 and the second external electronic device 104 under the control of the processor 120.

The first external electronic device 102 and the second external electronic device 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the first external electronic device 102, the second external electronic device 104, the server 106, and the like). According to an embodiment of the present disclosure, when the electronic device 101 should perform some function or service automatically or at a request, the electronic device 101, instead of executing the function or service on its own or additionally, may request another device (e.g., the first external electronic device 102, the second external electronic device 104, the server 106, and the like) to perform at least some functions associated therewith. The other electronic device (e.g., the first external electronic device 102, the second external electronic device 104, the server 106, and the like) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
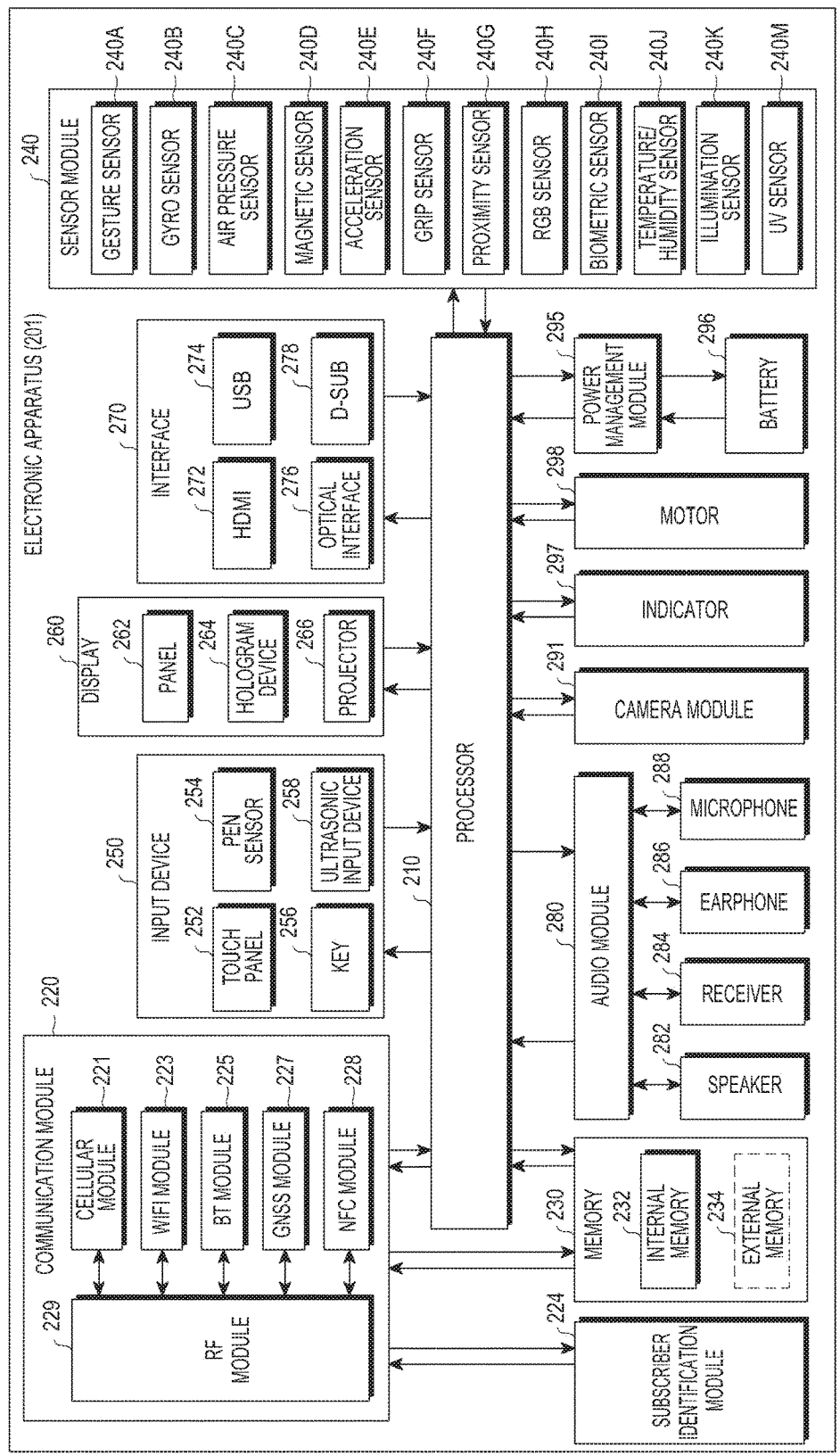
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphics processing unit (GPU) and/or an image signal processor (ISP). The processor 210 may include at least some (e.g., a cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, e.g., the cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the Bluetooth module 225, the GNSS module 227, or the NFC module 228 may include a processor for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a SIM and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), and the like) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, solid state drive (SSD), and the like.

The external memory 234 may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 234 may be functionally and/or physically connected with the electronic device 201 via various interfaces.

The sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultraviolet (UV) sensor 240M. Additionally or alternatively, the sensor module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensor module 240. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, IR, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may detect an ultrasonic wave generated from an input tool through a microphone (e.g., a microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment of the present disclosure, the display 260 may further include a control circuit to control the panel 262, the hologram device 264, or the projector 266.

The interface 270 may include e.g., an HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a SD card/MMC interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., a speaker 282, a receiver 284, an earphone 286, or the microphone 288.

The camera module 291 may be a device for capturing still images and videos, and may include, according to an embodiment of the present disclosure, one or more image sensors (e.g., front and back sensors), a lens, an ISP, or a flash, such as an LED, a xenon lamp, and the like.

The power manager module 295 may manage power of the electronic device 201, for example. Although not shown, according to an embodiment of the present disclosure, the power manager module 295 may include a power management IC (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, and the like, may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 3:
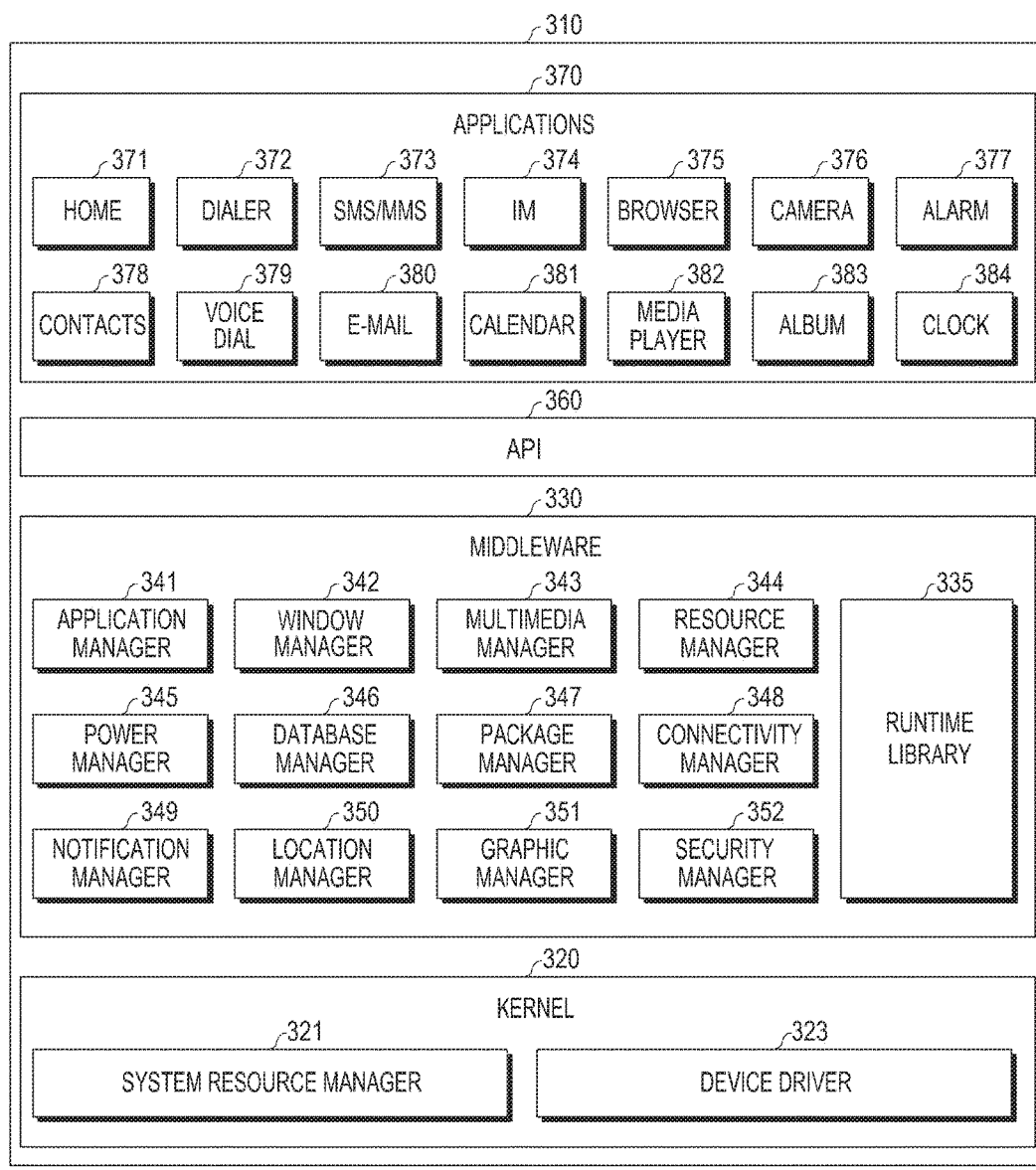
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, a program module 310 (e.g., the program 140) may include an OS controlling resources related to the electronic device (e.g., the electronic device 101) and/or various applications (e.g., the AP 147) driven on the OS. The OS may include, e.g., Android, iOS, Windows, Symbian, Tizen, or Bada.

The program module 310 may include, e.g., a kernel 320, middleware 330, an API 360, and/or an application 370. At least a part of the program module 310 may be preloaded on the electronic device or may be downloaded from an external electronic device (e.g., the first external electronic device 102, the second external electronic device 104, the server 106, and the like).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database (DB) manager 346, a package manager 347, a connectivity manager 348, a notification manager 349, a location manager 350, a graphic manager 351, or a security manager 352.

According to an embodiment of the present disclosure, the middleware 330 may perform all of the operations of the electronic device 101 as described in connection with FIG. 1. At least one of the multimedia manager 343, the resource manager 344, the package manager 347, or the connectivity manager 348 included in the middleware 330 may perform all of the operations of the processor 120 described in connection with FIG. 1.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as a source code of at least one of the applications 370, memory or storage space.

The power manager 345 may operate together with, e.g., a basic input/output system (BIOS) to manage battery or power and provide power information necessary for operating the electronic device. The DB manager 346 may generate, search, or vary a DB to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as an incoming message, appointment, or proximity notification, of the user without interfering with the user. The location manager 350 may manage locational information on the electronic device. The graphic manager 351 may manage graphic effects to be offered to the user and their related UI. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the AP 147) may include one or more applications that may provide functions, such as, e.g., a home function 371, a dialer function 372, a short message service (SMS)/multimedia messaging service (MMS) function 373, an instant message function (IM) 374, a browser function 375, a camera function 376, an alarm function 377, a contact function 378, a voice dial function 379, an email function 380, a calendar function 381, a media player function 382, an album function 383, a clock function 384, a health-care function (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the first external electronic device 102 and the second external electronic device 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, an email application, a health-care application, or environmental information application) to the external electronic device (e.g., the first external electronic device 102 and the second external electronic device 104). Further, the notification relay application may receive notification information from, e.g., the external electronic device and may provide the received notification information to the user.

The device management application may perform at least some functions of the external electronic device (e.g., the first external electronic device 102 or the second external electronic device 104) communicating with the electronic device (e.g., turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the first external electronic device 102 and the second external electronic device 104). According to an embodiment of the present disclosure, the application 370 may include an application received from the external electronic device (e.g., the server 106 or the first external electronic device 102 and the second external electronic device 104). According to an embodiment of the present disclosure, the application 370 may include a preloaded application or a third party application downloadable from a server. The names of the components of the program module 310 according to the shown embodiment may be varied depending on the type of OS.

According to an embodiment of the present disclosure, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, and the like, for performing one or more functions.

Figure 4:
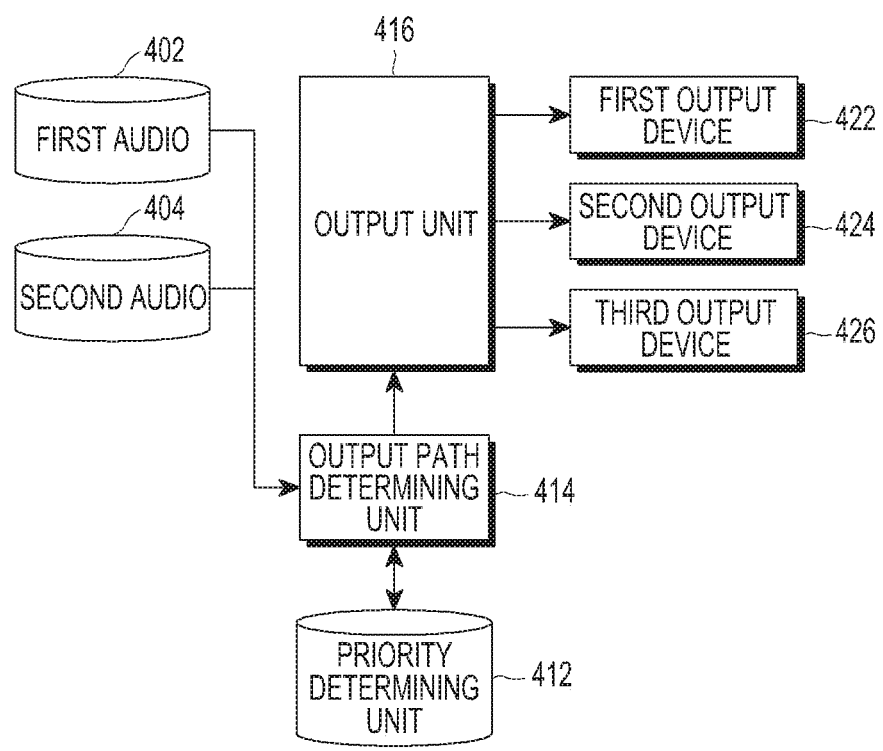
FIG. 4 is a block diagram illustrating a processor included in an electronic device according to an embodiment of the present disclosure.

FIG. 4 is a block diagram illustrating a processor included in an electronic device according to an embodiment of the present disclosure.

Referring to FIG. 4, it may be assumed that the electronic device 101 plays a first audio 402 and a second audio 404. It may also be assumed that the electronic device 101 outputs the first audio 402 or the second audio 404 through three audio output devices including the embedded speaker 182, e.g., a first output device 422, a second output device 424, and a third output device 426.

Referring to FIG. 4, the processor 120 may include at least one of a priority determining unit 412, an output path determining unit 414, and an output unit 416.

The priority determining unit 412 may determine the priority of each application, the priority of each output device, or the priority of each audio based on at least part of audio-related information regarding each application, audio-related information regarding each output device, or audio-related information regarding each audio. Referring to FIG. 4, the priority determining unit 412 may determine the priority of each of the first audio 402 and the second audio 404 or the priority of each of the first to third output devices 422, 424, and 426.

The output path determining unit 414 may determine an output device that outputs each of the first audio 402 or the second audio 404 based on at least part of the priority determined by the priority determining unit 412, e.g., the priority of each application, the priority of each output device, or the priority of each audio. The output unit 416 may be connected with the first to third output devices 422, 424, and 426 to output the first audio 402 or the second audio 404 to any one of the first to the third output devices 422, 424, and 426.

Referring to FIG. 4, the output path determining unit 414 may determine an output device to output the first audio 402 and an output device to output the second audio 404 based on the audio-related information regarding each of the first audio 402 and the second audio 404, e.g., at least part of the priority determined by the priority determining unit 412. The output path determining unit 414 may determine an audio output device that may first output the first audio 402 based on the first audio-related information. Likewise, the output path determining unit 414 may determine an audio output device that may first output the second audio 404 based on the first audio-related information.

According to an embodiment of the present disclosure, the output path determining unit 414 may determine whether the output devices to output the audios, respectively, overlap each other or whether there is an output device outputting other audio among the output devices outputting the audios, respectively. For example, an output device to output the first audio 402 may overlap an output device to output the second audio 404. The priority determining unit 412 may determine the priority of each of the first audio 402 and the second audio 404 based on the audio-related information regarding each of the first audio 402 and the second audio 404. For example, when the priority of the first audio 402 is higher than the priority of the second audio 404, the output path determining unit 414 may output the first audio 402 through the overlapping output device and determine to vary the output path of the second audio 404. For example, assuming that the overlapping output device is the second output device 424, the output path determining unit 414 may determine that the first audio 402 is output through the second output device 424. Further, the output path determining unit 414 may determine that the second audio 404 is output through any one of the first output device 422 or the third output device 426. For example, the output path determining unit 414 may set the output path of the first audio 402 so that the first audio 402 is output through the output unit 416 to the second output device 424. Further, the output path determining unit 414 may set the output path of the second audio 404 so that the second audio 404 is output through the output unit 416 to the first output device 422 or the third output device 426.

According to an embodiment of the present disclosure, the priority of each application, the priority of each output device, or the priority of each audio might not be determined by the priority determining unit 412. In such case, the output path determining unit 414 may determine the priority of the audio or the output device of the audio based on the audio-related information regarding the audio.

Figure 5:
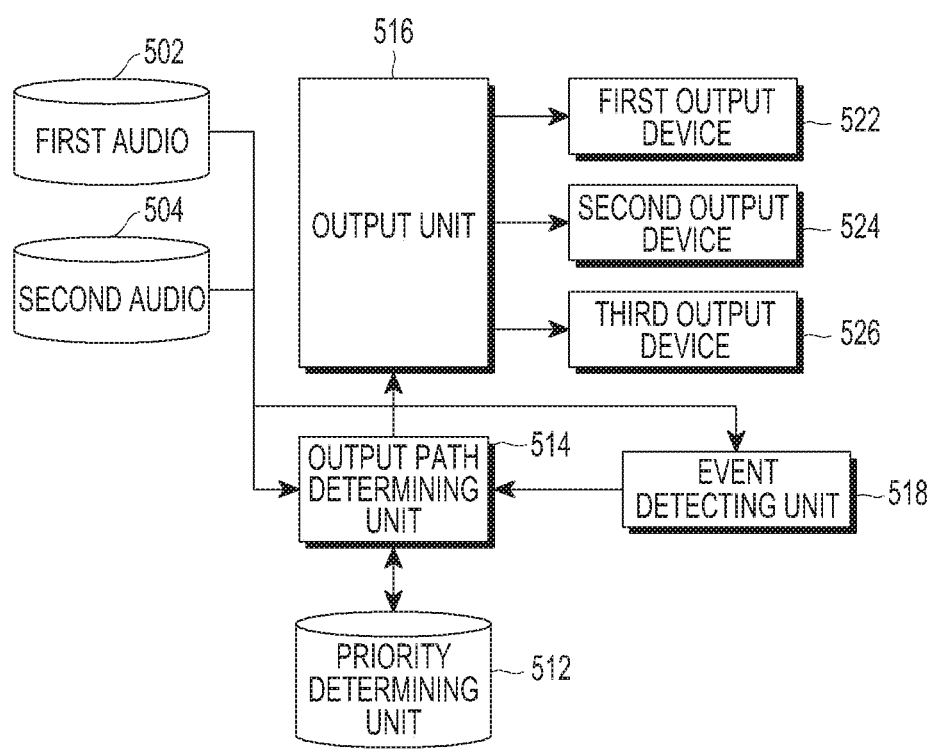
FIG. 5 is a block diagram illustrating a processor included in an electronic device according to an embodiment of the present disclosure.

FIG. 5 is a block diagram illustrating a processor included in an electronic device according to an embodiment of the present disclosure.

Referring to FIG. 5, it may be assumed that the electronic device 101 plays a first audio 502 and a second audio 504. It may also be assumed that the electronic device 101 outputs the first audio 502 or the second audio 504 through three audio output devices including the embedded speaker 182, e.g., a first output device 522, a second output device 524, and a third output device 526.

Referring to FIG. 5, the processor 120 may include at least one of a priority determining unit 512, an output path determining unit 514, an output unit 516, and an event detecting unit 518.

The priority determining unit 512 may determine the priority of each application, the priority of each output device, or the priority of each audio based on audio-related information regarding each application, audio-related information regarding each output device, or audio-related information regarding each audio. Referring to FIG. 5, the priority determining unit 512 may determine the priority of each of the first audio 502 and the second audio 504 or the priority of each of the first to third output devices 522, 524, and 526.

The output path determining unit 514 may determine an output device that outputs each of the first audio 502 or the second audio 504 based on the priority determined by the priority determining unit 512, e.g., the priority of each application, the priority of each output device, or the priority of each audio. Referring to FIG. 5, the output path determining unit 514 may determine an output device to output the first audio 502 and an output device to output the second audio 504 based on the audio-related information regarding each of the first audio 502 and the second audio 504, e.g., the priority determined by the priority determining unit 512.

According to an embodiment of the present disclosure, the output path determining unit 514 may determine whether the output devices to output the audios, respectively, overlap each other or whether there is an output device outputting other audio among the output devices outputting the audios, respectively. For example, an output device to output the first audio 502 may overlap an output device to output the second audio 504. The priority determining unit 512 may determine the priority of each of the first audio 502 and the second audio 504 for the overlapping output device based on the audio-related information regarding each of the first audio 502 and the second audio 504. For example, when the priority of the first audio 502 is higher than the priority of the second audio 504, the output path determining unit 514 may output the first audio 502 through the overlapping output device and determine to vary the output path of the second audio 504. For example, assuming that the overlapping output device is the second output device 524, the output path determining unit 514 may determine that the first audio 502 is output through the second output device 524. Further, the output path determining unit 514 may determine that the second audio 504 is output through any one of the first output device 522 or the third output device 526. For example, the output path determining unit 514 may set the output path of the first audio 502 so that the first audio 502 is output through the output unit 516 to the second output device 524. Further, the output path determining unit 514 may determine the output path of the second audio 504 so that the second audio 504 is output to the first output device 522 or the third output device 526.

According to an embodiment of the present disclosure, the priority of each application, the priority of each output device, or the priority of each audio might not be determined by the priority determining unit 512. In such case, the output path determining unit 514 may determine the priority of the audio or the output device of the audio based on the audio-related information regarding the audio.

According to an embodiment of the present disclosure, the output path determining unit 514 may determine the output path of each audio regardless of the priority of each application, the priority of each output device, or the priority of each audio. For example, the output path determining unit 514 may determine that the first output device 522 is the first output device of the first audio 502 and that the second output device 524 is the output device of the second audio 504. Here, the output path of the first audio 502 and the output path of the second audio 504 may be different output paths and may be managed by the output path determining unit 514 or the output unit 516.

The output unit 516 may be connected with the first to third output devices 522, 524, and 526 to output the first audio 502 or the second audio 504 to any one of the first to the third output devices 522, 524, and 526.

The event detecting unit 518 may detect an event related to the playback of the first audio 502 or an event related to the playback of the second audio 504. For example, when the first audio 502 is output by the first application, the event related to the playback of the first audio 502 may be an event related to the execution of the first application. Likewise, when the second audio 504 is output by the second application, the event related to the playback of the second audio 504 may be an event related to the execution of the second application. According to an embodiment of the present disclosure, the event detecting unit 518 may determine an application associated with the first audio 502 and the second audio 504 and provide information thereon to the output path determining unit 514. The output path determining unit 514 may determine the priority of each application based on the information transferred from the event detecting unit 518.

The output path determining unit 514 may determine an output device to output the first audio 502 and an output device to output the second audio 504 based on the audio-related information regarding each of the first audio 502 and the second audio 504, e.g., first audio-related information and second audio-related information. The output path determining unit 514 may determine an audio output device that may first output the first audio 502 based on the first audio-related information. Likewise, the output path determining unit 514 may determine an audio output device that may first output the second audio 504 based on the second audio-related information.

Here, an output device to output the first audio 502 may overlap an output device to output the second audio 504. The priority determining unit 512 may determine the priority of the first audio 502 and the second audio 504 based on the audio-related information regarding each of the first audio 502 and the second audio 504. For example, when the priority of the first audio 502 is higher than the priority of the second audio 504, the output path determining unit 514 may output the first audio 502 through the overlapping output device and determine to vary the output path of the second audio 504. For example, assuming that the overlapping output device is the first output device 522, the output path determining unit 514 may determine that the first audio 502 is output through the first output device 522. Further, the output path determining unit 514 may determine that the second audio 504 is output through any one of the second output device 524 or the third output device 526. For example, the output path determining unit 514 may set the output path of the first audio 502 so that the first audio 502 is output through the output unit 516 to the first output device 522. Further, the output path determining unit 514 may set the output path of the second audio 504 so that the second audio 504 is output through the output unit 516 to the second output device 524 or the third output device 526. As set forth above, the output device to output the second audio 504 may be changed by the output path determining unit 514 from the first output device 522 to the second output device 524 or the third output device 526 so that the output path of the second audio 504 may be adjusted.

According to an embodiment of the present disclosure, the priority determining unit 512 and the output path determining unit 514 may be implemented in a single device. The single device may execute all of the operations of the priority determining unit 512 and the output path determining unit 514.

Figure 6:
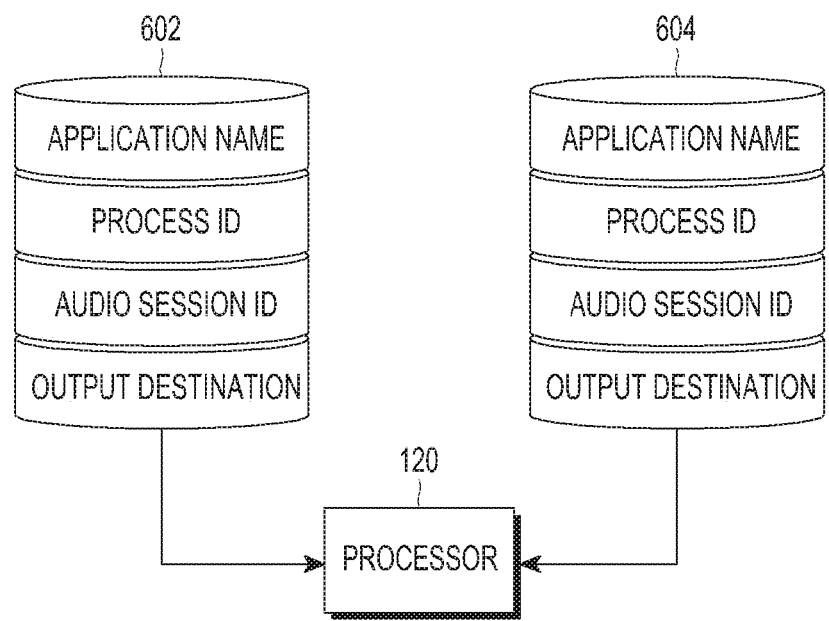
FIG. 6 illustrates audio-related information according to an embodiment of the present disclosure.

FIG. 6 illustrates audio-related information according to an embodiment of the present disclosure.

Referring to FIG. 6, the processor 120 may determine the output path of audio by each of applications outputting the audio based on information 602 and 604 on each of the applications. The information 602 and 604 may include at least one of the name of the application, process ID, audio session ID, and output destination. The processor 120 may determine the output path of the audio based on at least one of the name of the application, the process ID, the audio session ID, and the output destination.

The processor 120 may determine the priority of each application based on the name of the application. According to an embodiment of the present disclosure, the memory 130 may store information on the priority of each application. The processor 120 may determine the priority of each application based on the information on the priority stored in the memory 130.

According to an embodiment of the present disclosure, the memory 130 may store the priority of each process ID or information related to each process (e.g., the category where the application belongs). The processor 120 may determine the priority of each process based on the information stored in the memory 130.

According to an embodiment of the present disclosure, the memory 130 may store information on the priority of each audio session or information on the application related to each audio session (e.g., the category where the application belongs). The processor 120 may determine the priority of each audio session based on the information included in the memory 130.

According to an embodiment of the present disclosure, the memory 130 may store information on the priority of each output destination, information on the application related to each output destination, or information on each output device related to each output destination (e.g., the priority of each output device or type of each output device). The processor 120 may determine the priority of each application based on the information stored in the memory 130.

Figure 7:
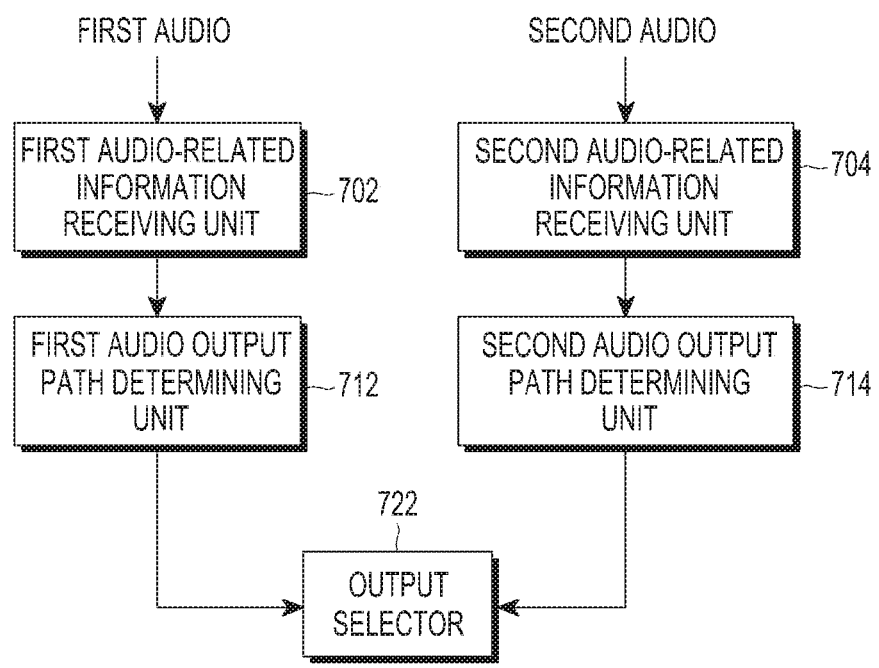
FIG. 7 illustrates a processor according to an embodiment of the present disclosure.

FIG. 7 illustrates a processor according to an embodiment of the present disclosure. In FIG. 7, the first audio may be an audio generated by the first application, and the second audio may be an audio generated by the second application.

Referring to FIG. 7, the processor 120 may include one or more audio-related information receiving units (e.g., a first audio-related information receiving unit 702, and a second audio-related information receiving unit 704), one or more audio output path determining units (e.g., a first audio output path determining unit 712, and a second audio output path determining unit 714), and an output selector 722.

The first audio-related information receiving unit 702 may receive first audio-related information on the first audio, and the second audio-related information receiving unit 704 may receive second audio-related information on the second audio.

The first audio output path determining unit 712 may determine the audio output device outputting the first audio based on the first audio-related information. The second audio output path determining unit 714 may determine the audio output device outputting the second audio based on the second audio-related information.

The output selector 722 may switch the first audio to the audio output device determined by the first audio output path determining unit 712. Further, the output selector 722 may switch the second audio to the audio output device determined by the second audio output path determining unit 714.

According to an embodiment of the present disclosure, the audio output device outputting the first audio may overlap the audio output device outputting the second audio. The output selector 722 may prevent the first audio and the second audio from being output through a single output device by switching the output path of the first audio or the output path of the second audio.

Figure 8:
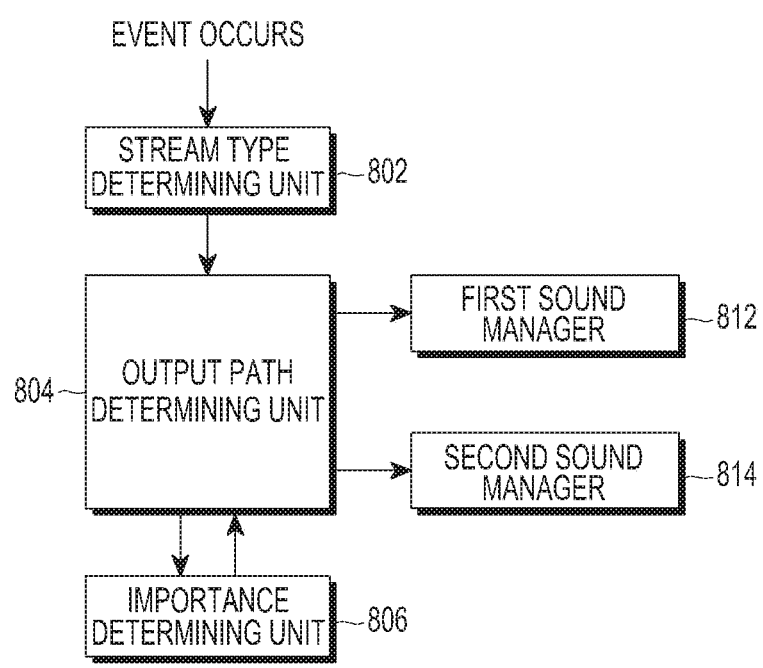
FIG. 8 illustrates a processor according to an embodiment of the present disclosure.

FIG. 8 illustrates a processor according to an embodiment of the present disclosure.

Referring to FIG. 8, the processor 120 may include at least one of a stream type determining unit 802, an output path determining unit 804, an importance determining unit 806, a first sound manager 812, and a second sound manager 814.

The electronic device 101 may be encountered with an event, for example, the event of detecting a user input for running an application, the event of detecting the generation of a notification on the system, or the event of detecting the reception of data from an external electronic device (e.g., the first external electronic device 102 or the second external electronic device 104) or the server 106 wiredly or wirelessly connected with the electronic device 101.

The stream type determining unit 802 may detect the occurrence of the event. When the event occurs, the stream type determining unit 802 may determine the stream type of audio according to the occurring event. For example, the stream type determining unit 802 may determine whether the audio by the event is temporary or continuous. For example, the stream type determining unit 802 may determine the type of event by the audio (e.g., a call-related event, a notification/alarm-related event, or system-related event) as the stream type.

The stream type determining unit 802, upon determining the stream type of audio by the event, may inform the output path determining unit 804 of the stream type.

The output path determining unit 804 may transfer the audio or the stream type of the audio to the importance determining unit 806. The importance determining unit 806 may determine the importance of the event or audio. For example, the electronic device 101 may receive a call. Further, it may be assumed that the call reception event has the highest importance on the electronic device 101 and the importance may be divided into higher, middle, and lower levels. The importance determining unit 806 may determine that the importance of the call reception event or the audio by the call reception event is at "higher" level.

According to an embodiment of the present disclosure, the output path determining unit 804 may determine whether the audio, e.g., the first audio, is to be managed separately from other audio, e.g., the second audio, based on the importance of the event or the importance of the audio by the event determined by the importance determining unit 806. When the first audio is managed separately from the second audio, the output path determining unit 804 may determine the output device or output path of the first audio and route the first audio to the first sound manager 812. The first sound manager 812 may output the first audio through the output device (e.g., the embedded sound device or external audio device) determined by the output path determining unit 804.

For example, the first audio by the event with the "higher" importance may be previously set to be output through the embedded speaker 182 of the electronic device 101. When the event whose importance is "higher" as determined by the importance determining unit 806 occurs, the output path determining unit 804 may determine the embedded speaker 182 as the output device of the first audio by the event. Although the second audio is being output through the embedded speaker 182, the output path determining unit 804 may determine the output device of the first audio as the embedded speaker 182. Further, the output path determining unit 804 may change the output device of the second audio being output through the embedded speaker 182.

According to an embodiment of the present disclosure, the output path determining unit 804 may manage the audio by the call-related event or notification/alarm-related event separately from other audio. The audio by the call-related event or notification/alarm-related event may have the highest priority in the electronic device 101 and may be output through the output device previously set by the output path determining unit 804 or a user input.

When the first audio need not be separate from the second audio, the output path determining unit 804 may route the first audio to the second sound manager 814. The output path determining unit 804 may determine the output device or output path of the first audio based on, e.g., the priority per audio, priority per event-related application, or priority per output device.

According to an embodiment of the present disclosure, an electronic device may comprise a first communication module using a first communication protocol, a second communication module using a second communication protocol, a display, an embedded sound device, a processor electrically connected with the first communication module, the second communication module, the display, and the embedded sound device, and a memory electrically connected with the processor, wherein the memory is configured to store instructions executed to enable the processor to: transmit a signal including audio/video (A/V) data to a first external electronic device through the first communication module, while connected with the first external electronic device, generate data or a signal unrelated to the A/V data or receive the data or the signal unrelated to the A/V data from an external electronic device other than the first external electronic device, and provide an audio or a video through the display or the embedded sound device based on at least a portion of the data or the signal unrelated to the A/V data or transmit the at least a portion of the data or the signal unrelated to the A/V data to a second external electronic device through the second communication module.

According to an embodiment of the present disclosure, the instructions may enable the processor to receive a call signal from the other external electronic device while transmitting the signal including the A/V data through the first communication module, and in response to the reception of the call signal, provide an audio related to the call signal to a user using the embedded sound device or transmit a signal including the audio related to the call signal to the second external electronic device through the second communication module.

According to an embodiment of the present disclosure, the instruction may enable the processor to receive a user input accepting the call signal after receiving the call signal, and after receiving the user input, provide a call voice to the user using the embedded sound device or transmit a signal including the call voice to the second external electronic device through the second communication module.

According to an embodiment of the present disclosure, the first communication protocol and the second communication protocol may support communication within about 100 meters.

According to an embodiment of the present disclosure, the first communication protocol may include a Wi-Fi protocol, and the second communication protocol may include a Bluetooth protocol.

According to an embodiment of the present disclosure, the data or the signal unrelated to the A/V data generated by the processor may include at least one of an alarm or a notification.

According to an embodiment of the present disclosure, an electronic device may comprise a first communication module using a first communication protocol providing at least one communication path, a second communication module using a second communication protocol, a display, an embedded sound device, a processor electrically connected with the first communication module, the second communication module, the display, and the embedded sound device, and a memory electrically connected with the processor, wherein the memory is configured to store instructions executed to enable the processor to connect to a first external electronic device to transmit a signal including A/V data to a first communication path through the first communication module, while connected with the first external electronic device, generate data or a signal unrelated to the A/V data or receive the data or the signal unrelated to the A/V data from an external electronic device other than the first external electronic device, and provide an audio or a video through the display or the embedded sound device to a user based on at least a portion of the data or the signal unrelated to the A/V data or transmit the at least a portion of the data or the signal unrelated to the A/V data to a second external electronic device through a second communication path of the first communication module.

According to an embodiment of the present disclosure, the instructions may enable the processor to receive a call signal from the other external electronic device while transmitting the signal including the A/V data through the first communication module, and in response to the reception of the call signal, provide an audio related to the call signal to a user using the embedded sound device or transmit a signal including the audio related to the call signal to the second external electronic device through the second communication module.

According to an embodiment of the present disclosure, the instruction may enable the processor to receive a user input accepting the call signal after receiving the call signal, and after receiving the user input, provide a call voice to the user using the embedded sound device or transmit a signal including the call voice to the second external electronic device through the second communication module.

According to an embodiment of the present disclosure, the first communication protocol and the second communication protocol may support communication within about 100 meters.

According to an embodiment of the present disclosure, the first communication protocol may include a Wi-Fi protocol, and the second communication protocol may include a Bluetooth protocol.

According to an embodiment of the present disclosure, the data or the signal unrelated to the A/V data generated by the processor may include at least one of an alarm or a notification.

Figure 9:
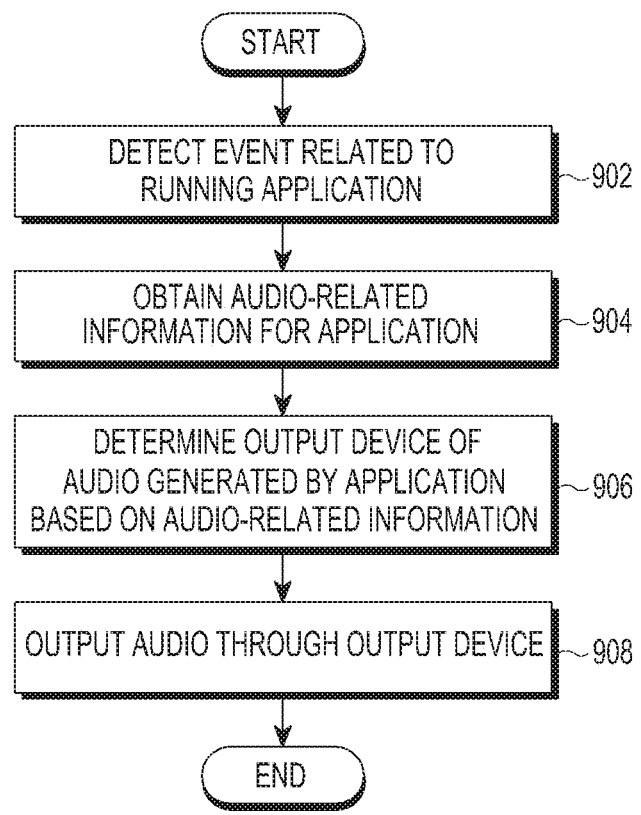
FIG. 9 is a flowchart illustrating outputting audio by an electronic device according to an embodiment of the present disclosure.

FIG. 9 is a flowchart illustrating outputting audio by an electronic device according to an embodiment of the present disclosure.

Referring to FIG. 9, in operation 902, the processor 120 may detect an event related to running an application. The event related to running the application may be, for example, the event of detecting a user input for running an application, the event of detecting the generation of a notification on the system, or the event of detecting the reception of data from an external electronic device (e.g., the first external electronic device 102 or the second external electronic device 104) or the server 106 wiredly or wirelessly connected with the electronic device 101.

Upon detecting the event related to running the application, in operation 904, the processor 120 may obtain information associated with an audio generated by the application for the application, i.e., audio-related information. According to an embodiment of the present disclosure, the audio-related information may be previously stored in the memory 130 corresponding to the application. The processor 120 may identify (or extract) the audio-related information included in, e.g., an installation file or execution file of the application from the installation file or the execution file and store the same in the memory 130. According to an embodiment of the present disclosure, the audio-related information may be information set by the user according to a user input. According to an embodiment of the present disclosure, the processor 120 may record, in the memory 130, the audio-related information based on the output pattern of the audio by the application. For example, when the audio by a call-related application is primarily output through the embedded speaker 182, the processor 120 may set the embedded speaker 182 as the top-priority output device of the audio by the call-related application and may record or store the same as audio-related information corresponding to the call-related application.

The audio-related information may include, e.g., a category where the application belongs, an output path history of the audio, the priority of output devices that may output the audio, the priority per application for each output device, time of generation of the audio, and attribute information on the audio (e.g., sound quality, genre, or play time of the audio). The processor 120 may obtain the audio-related information for the application through the data included in the application or when the application is installed on the electronic device 101.

For example, the respective installation files of one or more applications may previously include the audio-related information on the applications. The processor 120 may identify (or extract) the audio-related information or part of the audio-related information from the installation files and record or store the information in the memory 130. Further, when the event of running the application occurs, the processor 120 may determine an output device to output the audio by the application by referring to the audio-related information or part of the audio-related information recorded in the memory 130.

For example, the processor 120 may identify (or check) the audio-related information from the execution file whenever the application runs. Further, when the application runs, the processor 120 may identify (or extract) the audio-related information from the execution file and separately store the information in the memory 130. The processor 120 may identify (or extract) the relevant audio-related information by identifying (or extracting) the audio-related information included in the execution file of the application or the audio-related information stored in the memory 130.

In operation 906, the processor 120 may determine the output device or output path to output the audio generated by the application based on the audio-related information. The audio-related information may include information associated with the settings of the output device to output the audio by the application. For example, in the audio-related information, a Bluetooth speaker, the embedded speaker 182, and an earphone, respectively, may be designated as the primary output device, secondary output device, and tertiary output device to output the audio by the application. The processor 120 may determine the Bluetooth speaker as the output device to output the audio based on the audio-related information. Here, the processor 120 may determine whether the Bluetooth speaker is in connection with the electronic device 101, and when the Bluetooth speaker is in connection, may determine the output path of the audio so that the audio is output through the Bluetooth speaker. When the primary output device, i.e., the Bluetooth speaker, is not connected with the electronic device 101, the processor 120 may determine to output the audio through the secondary output device, i.e., the embedded speaker 182.

According to an embodiment of the present disclosure, when the Bluetooth speaker is not connected with the electronic device 101, the processor 120 may discover the surroundings of the electronic device 101 through the communication interface 170 and may determine whether there is a Bluetooth speaker connectable with the electronic device 101 based on a result of the discovery. When there is a Bluetooth speaker connectable with the electronic device 101 around the electronic device 101 (e.g., within a radius of 100 meters of the electronic device 101), the processor 120 may control the communication interface 170 to connect the Bluetooth speaker with the electronic device 101.

When the output device to output the audio is determined as above, in operation 908, the processor 120 may output the audio of the application through the output device. According to an embodiment of the present disclosure, the processor 120 may control the electronic device 101 so that the audio corresponding to the application is output through the output device while the application is running.

Figure 10:
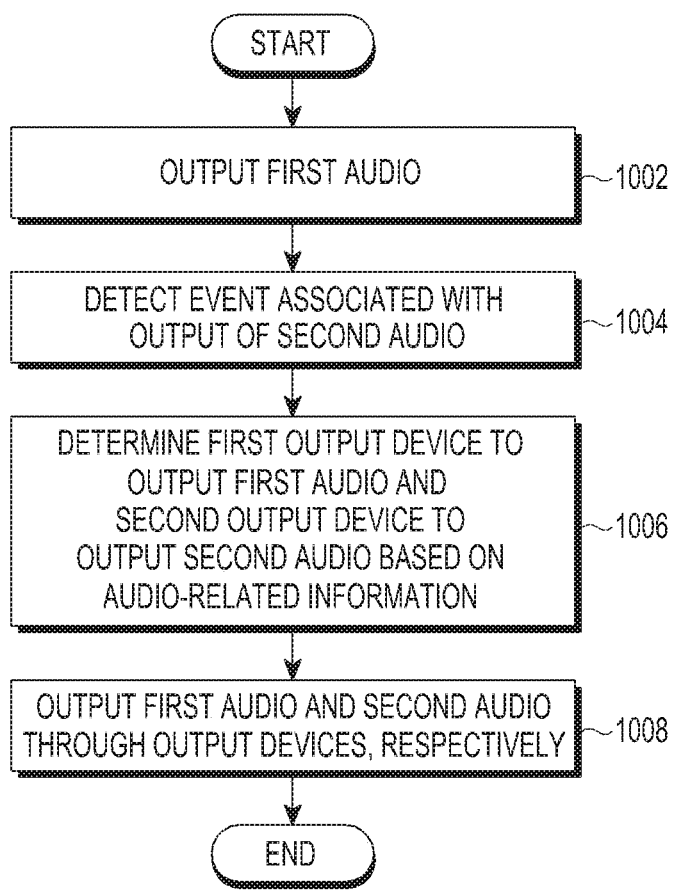
FIG. 10 is a flowchart illustrating outputting audio by an electronic device according to an embodiment of the present disclosure.

FIG. 10 is a flowchart illustrating outputting audio by an electronic device according to an embodiment of the present disclosure.

Referring to FIG. 10, while the electronic device 101 is outputting the first audio in operation 1002, an event associated with the output of the second audio may be detected in operation 1004. The event associated with the output of the second audio may be, for example, the event of receiving a user input for running an application, the event of detecting the generation of a notification on the system, or the event of detecting the reception of data from an external electronic device (e.g., the first external electronic device 102 or the second external electronic device 104) or the server 106 wiredly or wirelessly connected with the electronic device 101.

According to an embodiment of the present disclosure, the event detected in operation 1004 may be a notification event or alarm event related to an application, such as a phone application, a message application, an email application, a schedule application, and the like. The notification event or alarm event may be an event where such data has occurred as to notify the reception of a call, message, or email, or such an event as to display and provide the schedule alarm to the user.

Upon detecting the event associated with the output of the second audio, in operation 1006 the processor 120 may determine at least one of a first output device to output the first audio and a second output device to output the second audio by the second application based on the audio-related information corresponding to each of the first audio and the second audio. The audio-related information may have an output device to output the audio set therein. For example, in the first audio-related information, a Bluetooth speaker, an earphone, and an embedded speaker, respectively, may be designated as the primary output device, secondary output device, and tertiary output device to output the first audio. The processor 120 may determine the Bluetooth speaker as the output device to output the first audio based on the first audio-related information. Likewise, in the second audio-related information, the embedded speaker 182, the earphone, and the Bluetooth speaker, respectively, may be designated as the primary output device, secondary output device, and tertiary output device to output the second audio. The processor 120 may determine the embedded speaker 182 as the output device to output the second audio based on the second audio-related information.

According to an embodiment of the present disclosure, the first output device in operation 1006 may be different from the output device outputting the first audio in operation 1002. For example, the first output device in operation 1002 may be the embedded speaker 182, and the first output device in operation 1006 may be a headset connected with the electronic device 101.

When the event associated with the output of the second audio occurs in operation 1004, the processor 120 may re-determine the output device to output the first audio as in operation 1006 while simultaneously determine each output device to output the second audio. Here, the processor 120 may determine each output device so that the output device to output the first audio does not overlap the output device to output the second audio.

As described above, when the output devices respectively to output the first audio and the second audio are determined, the processor 120 may output the first audio and the second audio through the output devices, respectively in operation 1008.

For example, it may be assumed that the electronic device 101 and a TV are mirroring-connected wirelessly, and so, the movie playing through the display 160 of the electronic device 101 is being displayed on the screen of the TV as well. The audio related to the movie may be transmitted from the electronic device 101 to the TV via wireless communication, and the TV may output the movie-related audio through the speaker included in the TV. When the movie is being played as above, the electronic device 101 may receive a call. The processor 120 of the electronic device 101 may determine the embedded speaker 182 of the electronic device 101 or an earphone connected with the electronic device 101 as the output device to output the audio related to the call. As described above, the movie-related audio may be output through the speaker of the TV while the call-related audio may be output through the embedded speaker 182 of the electronic device 101 or the earphone, so that the processor 120 may output the two audios through different devices.

Figure 11:
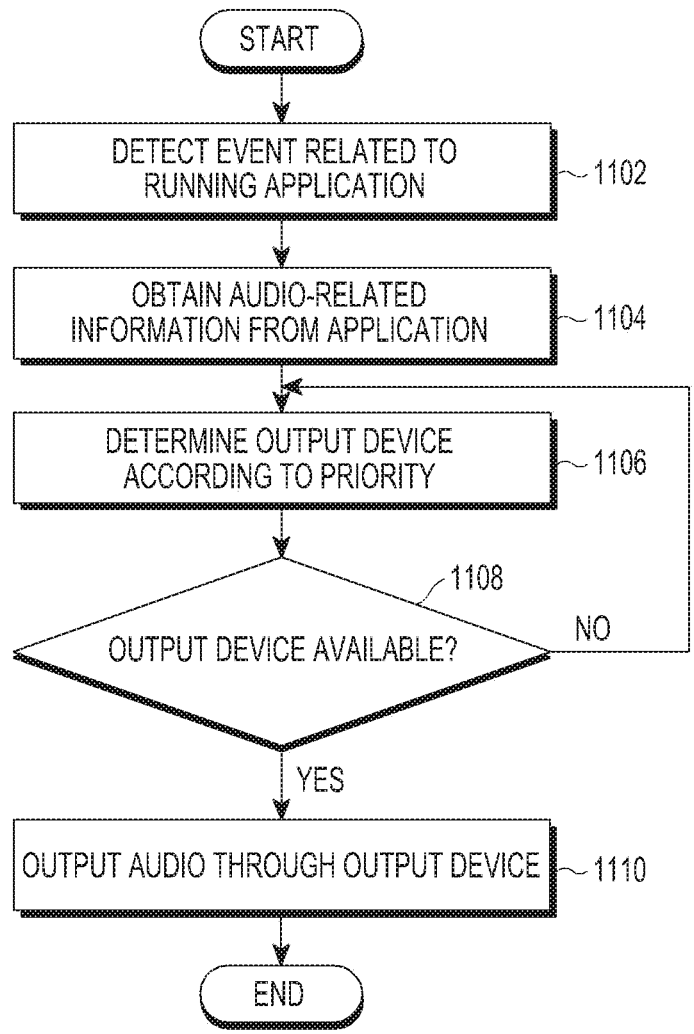
FIG. 11 is a flowchart illustrating outputting audio by an electronic device according to an embodiment of the present disclosure.

FIG. 11 is a flowchart illustrating outputting audio by an electronic device according to an embodiment of the present disclosure.

Referring to FIG. 11, the processor 120 may detect an event related to running an application in operation 1102. Subsequently, the processor 120 may obtain audio-related information for the application in operation 1104. In operation 1104, the processor 120 may identify (or extract) and obtain the audio-related information included in the execution file of the application. According to an embodiment of the present disclosure, the processor 120 may obtain the audio-related information by identifying the audio-related information from the memory 130 previously storing the audio-related information.

The processor 120 may determine the priority of each output device for the application based on the audio-related information. The processor 120 may determine the output device to output the audio according to the priority based on the audio-related information in operation 1106.

The processor 120 may determine whether the output device determined by the processor 120 is available in operation 1108. Although there is an output device required by the application, when the output device is not included in the electronic device 101 or the output device is an external audio device and is thus not connected with the electronic device 101, the output device may be determined to be unavailable. Further, although the output device is included in the electronic device 101 or connected with the electronic device 101, when the output device is previously outputting other audio, the processor 120 may determine that the output device is unavailable.

When it is determined in operation 1108 that the output device is unavailable (1108: NO), the processor 120 may determine an output device according to the priority of the application or the priority of the audio by the application in operation 1106. Here, the processor 120 may determine an output device different from the previous one as the output device to output the audio. When the output device is re-determined in operation 1106, the processor 120 may determine whether the output device is available in operation 1108. The processor 120 may determine that the audio is output through the output device first assignable as the output device to output the audio by the application. Here, the processor 120 may determine the output device based on the attribute (e.g., the category of the application) of the application. According to an embodiment of the present disclosure, the processor 120 may determine in operation 1106 that the audio is output through the output device first assignable as the output device to output the audio considering the attribute of the audio (e.g., genre or sound quality).

When it is determined in operation 1108 that the output device is available (1108: YES), the processor 120 may determine the output device as the output device to output the audio by the application. Subsequently, the processor 120 may control the electronic device 101 so that the audio is output through the output device in operation 1110.

Figure 12:
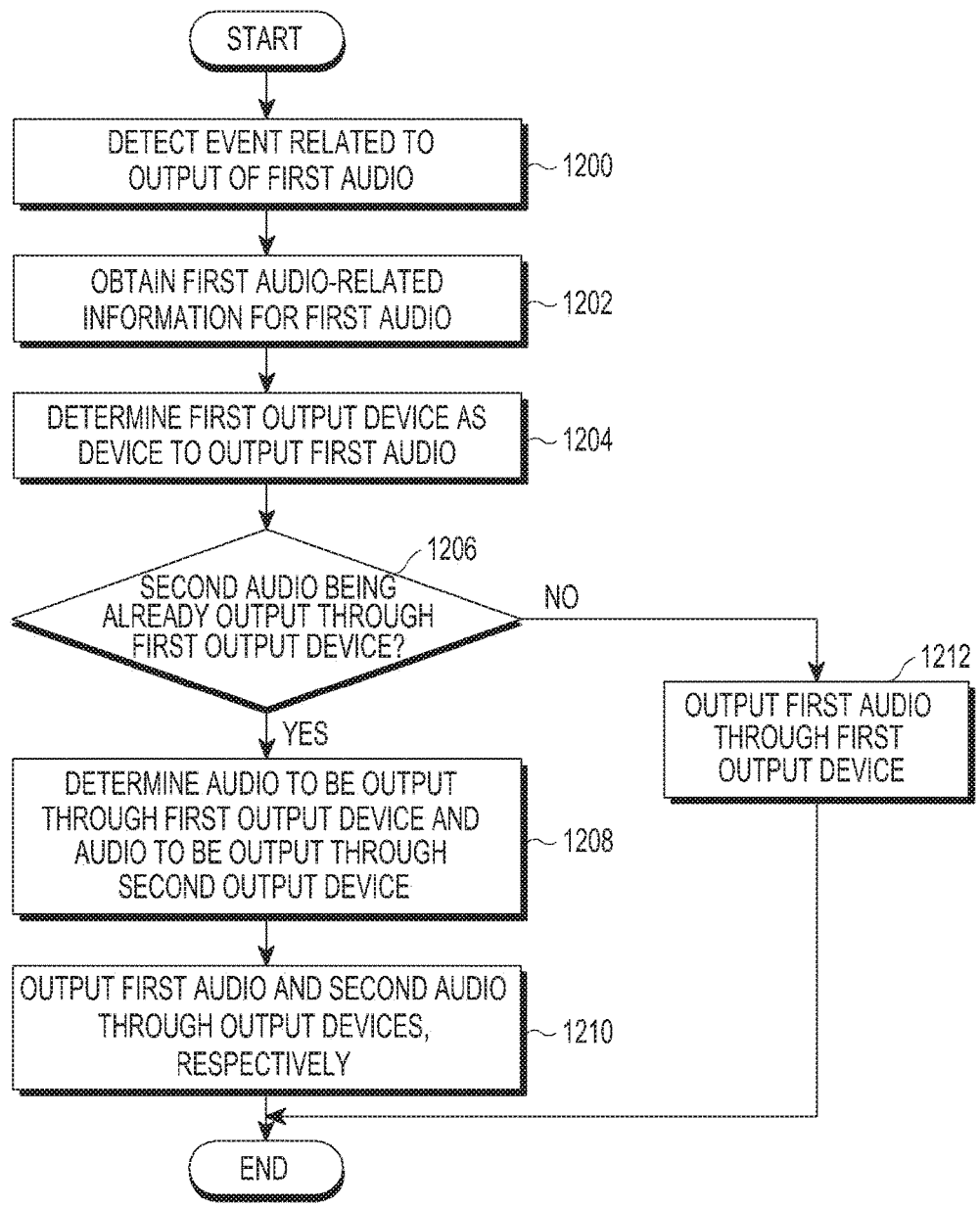
FIG. 12 is a flowchart illustrating outputting audio by an electronic device according to an embodiment of the present disclosure.

FIG. 12 is a flowchart illustrating outputting audio by an electronic device according to an embodiment of the present disclosure.

Referring to FIG. 12, the processor 120 may detect an event related to audio output in operation 1200. Subsequently, the processor 120 may obtain first audio-related information for the first audio in operation 1202. In operation 1202, the processor 120 may obtain the first audio-related information by identifying (or extracting) the first audio-related information included in the execution file of the first application associated with the first audio (or generating the first audio). According to an embodiment of the present disclosure, the processor 120 may obtain the audio-related information by receiving the first audio-related information from the memory 130 previously storing the audio-related information.

The processor 120 may determine the first output device as the output device to output the first audio based on the first audio-related information in operation 1204. The processor 120 may determine whether audio other than the first audio, e.g., the second audio, is already being output through the first output device in operation 1206. Here, the second audio may be an audio associated with an application other than the first application, e.g., the second application (or generating the second audio). According to an embodiment of the present disclosure, the processor 120 may prevent the simultaneous output of the first audio and the second audio through the first output device by performing operation 1206 before outputting the first audio.

Upon determining that the first audio is output through the first output device while other audio, e.g., the second audio, is being already output through the first output device, the first output device may end up with overlapping output of the first audio and the second audio. Accordingly, prior to outputting the first audio through the first output device, operation 1206 may be performed, so that the processor 120 may determine whether other audio (e.g., second audio) than the first audio is already output (played) through the first output device. Further, by doing so, the processor 120 may prevent the overlapping output of the first audio and the second audio through the first output device.

When it is determined in operation 1206 that the second audio is not output through the first output device (1206: NO), e.g., when no audio is output through the first output device, the processor 120 may control the electronic device 101 so that the first audio is output through the first output device in operation 1212.

When it is determined in operation 1206 that the second audio is being output through the first output device (1206: YES), the processor 120 may determine the audio to be output through the first output device and the audio to be output through other output device than the first output device, e.g., the second output device in operation 1208. In operation 1208, the processor 120 may determine the audio of the first audio and the second audio, which is to be output through the first output device, based on the priority of each application for the first output device or the priority of each audio. Further, the processor 120 may determine that audio other than the audio to be output through the first output device is output through the second output device. For example, when the first audio is determined to be output through the first output device, the second audio may be determined to be output through the second output device. On the contrary, when the second audio is determined to be output through the first output device, the first audio may be determined to be output through the second output device.

According to an embodiment of the present disclosure, the priority may be determined based on the first audio-related information and the second audio-related information. In operation 1208, the processor 120 may change the output device to output the first audio into an output device other than the first output device, e.g., the second output device, to change the output path of the first audio. Further, the processor 120 may change the output device to output the second audio into an output device (e.g., the second output device) other than the first output device to change the output path of the second audio. The processor 120 may separately output the first audio and the second audio through the output devices, respectively, in operation 1210.

For example, it may be assumed that an application, Appl-01, is running, and an audio, Audio-01, by Appl-01 is being output through an external audio device, ExternalOutput-01, connected with the electronic device 101. When a user input is input to run application Appl-02, and audio Audio-02 by Appl-02 is determined by the processor 120 to be output through ExternalOutput-01, ExternalOutput-01 may end up with overlapping output of Audio-01 and Audio-02. The processor 120 may re-determine the respective output devices of Audio-01 and Audio-02 based on the audio-related information of each of Appl-01 and Appl-02. For example, the processor 120 may determine the audio to be output through ExternalOutput-01 based on the priority of each application for ExternalOutput-01. Regarding the priority of each application for ExternalOutput-01, when the priority of Appl-01 is higher than the priority of Appl-02, the processor 120 may determine that the audio by Appl-01, i.e., Audio-01, is output through ExternalOutput-01 and Audio-02 is output through another device.

For example, it may be assumed that the electronic device 101 is connected with a Bluetooth speaker. The user may receive a schedule through a schedule-related application of the electronic device 101. It may be assumed that the electronic device 101 is providing the schedule to the user through the Bluetooth speaker. Further, it may be assumed that the user has run a music-related application for playing music. The processor 120 may identify the audio-related information on the music-related application to determine the Bluetooth speaker as the output device to output the audio by the music-related application. Since the audio by the schedule-related application and the audio by the music-related application may be all output through the Bluetooth speaker, the processor 120 may adjust the output path of the audio by the schedule-related application or the music-related application. When it is determined for the priority of each application for the Bluetooth speaker that the priority of the music-related application is higher than the priority of the schedule-related application, the processor 120 may determine that the audio by the music-related application is output through the Bluetooth speaker. Further, the output path of the audio by the schedule-related application, e.g., providing the schedule, may be changed to be output through an output device other than the Bluetooth speaker. The priority may be previously set for each application or may be determined by the processor 120.

According to an embodiment of the present disclosure, when two or more audios may be output through one output device in an overlapping manner, the processor 120 may change the output path of each audio. For example, it may be assumed that while the user enjoys music using the electronic device 101, i.e., through the embedded speaker, the user may receive a call. The processor 120 may search for other output devices than the embedded speaker 182 and determine the output path of the audio by the call-related application so that the user may talk on the phone through the searched output device (e.g., an earphone). Alternatively, the processor 120 may determine that the audio by the call-related application is output through the embedded speaker 182 and may search for other output devices than the embedded speaker 182 to output music.

According to an embodiment of the present disclosure, the memory 130 may store a list of per-priority output devices (hereinafter, "connection list") to output audio for an application. The connection list may include devices able to output the audio by the application, e.g., one or more output devices previously provided in the electronic device 101 or information on one or more external output devices (e.g., the name or priority of each output device). The processor 120 may determine the output device of the audio by each application by referring to the connection list.

According to an embodiment of the present disclosure, when the application with no audio-related information and the application with audio-related information are simultaneously run, the processor 120 may determine that the application with the audio-related information has a higher priority over the application with no audio-related information in determining the priority per application for the output device.

According to an embodiment of the present disclosure, a method for communicating data by an electronic device may comprise transmitting a signal including A/V data to a first external electronic device through a first communication module, while connected with the first external electronic device, generating data or a signal unrelated to the A/V data or receiving the data or the signal unrelated to the A/V data from an external electronic device other than the first external electronic device, and providing an audio or a video through a display or an embedded sound device based on at least a portion of the data or the signal unrelated to the A/V data or transmitting the at least a portion of the data or the signal unrelated to the A/V data to a second external electronic device through a second communication module.

According to an embodiment of the present disclosure, the method may further comprise receiving a call signal from the other external electronic device while transmitting the signal including the A/V data through the first communication module and in response to the reception of the call signal, providing an audio related to the call signal to a user using the embedded sound device or transmitting a signal including the audio related to the call signal to the second external electronic device through the second communication module.

According to an embodiment of the present disclosure, the method may further comprise receiving a user input accepting the call signal after receiving the call signal and after receiving the user input, providing a call voice to the user using the embedded sound device or transmitting a signal including the call voice to the second external electronic device through the second communication module.

According to an embodiment of the present disclosure, the first communication module may use a first communication protocol, and the second communication module may use a second communication protocol different from the first communication protocol, and the first communication protocol and the second communication protocol may support communication within about 100 meters.

According to an embodiment of the present disclosure, the first communication protocol may include a Wi-Fi protocol, and the second communication protocol may include a Bluetooth protocol.

According to an embodiment of the present disclosure, the data or the signal unrelated to the A/V data may include at least one of an alarm or a notification.

According to an embodiment of the present disclosure, a method for communicating data by an electronic device may comprise connecting to a first external electronic device to transmit a signal including A/V data to a first communication path through a first communication module, while connected with the first external electronic device, generating data or a signal unrelated to the A/V data or receiving the data or the signal unrelated to the A/V data from an external electronic device other than the first external electronic device, and providing an audio or a video through a display or an embedded sound device to a user based on at least a portion of the data or the signal related to the A/V data or transmitting the at least a portion of the data or the signal related to the A/V data to a second external electronic device through a second communication path.

According to an embodiment of the present disclosure, the method may further comprise receiving a call signal from the other external electronic device while transmitting the signal including the A/V data through the first communication module and in response to the reception of the call signal, providing an audio related to the call signal to a user using the embedded sound device or transmitting a signal including the audio related to the call signal to the second external electronic device through the second communication module.

According to an embodiment of the present disclosure, the method may further comprise receiving a user input accepting the call signal after receiving the call signal and providing a call voice to the user using the embedded sound device or transmitting a signal including the call voice to the second external electronic device through the second communication module.

According to an embodiment of the present disclosure, the first communication module may include a first communication protocol providing at least one communication path, and the second communication module may include a second communication protocol different from the first communication protocol, and the first communication protocol and the second communication protocol may support communication within about 100 meters.

According to an embodiment of the present disclosure, the first communication protocol may include a wireless local area network (WLAN) protocol (e.g., Wi-Fi/IEEE 802.11 standard protocol), and the second communication protocol may include a short-range wireless communication (e.g., Bluetooth protocol).

According to an embodiment of the present disclosure, the data or the signal unrelated to the A/V data may include at least one of an alarm or a notification.

Figure 13A:
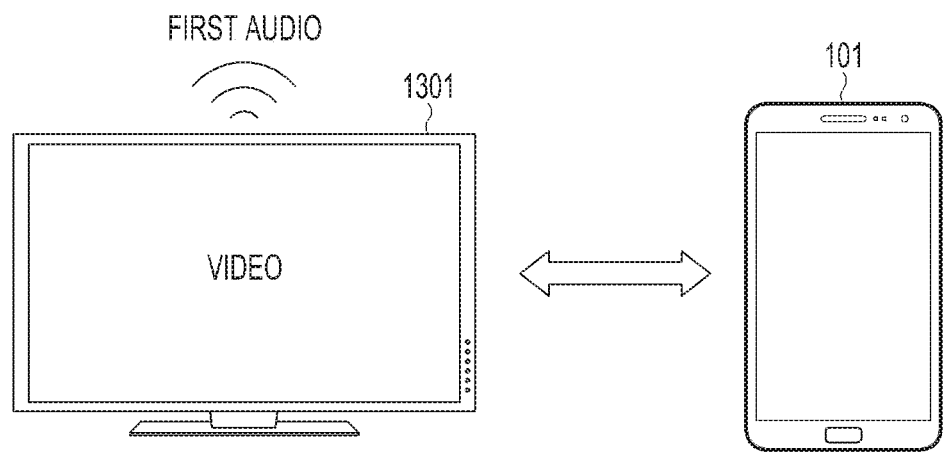
FIGS. 13A and 13B illustrate an electronic device and an external device connected with the electronic device according to an embodiment of the present disclosure.
Figure 13B:
Figure 13B:
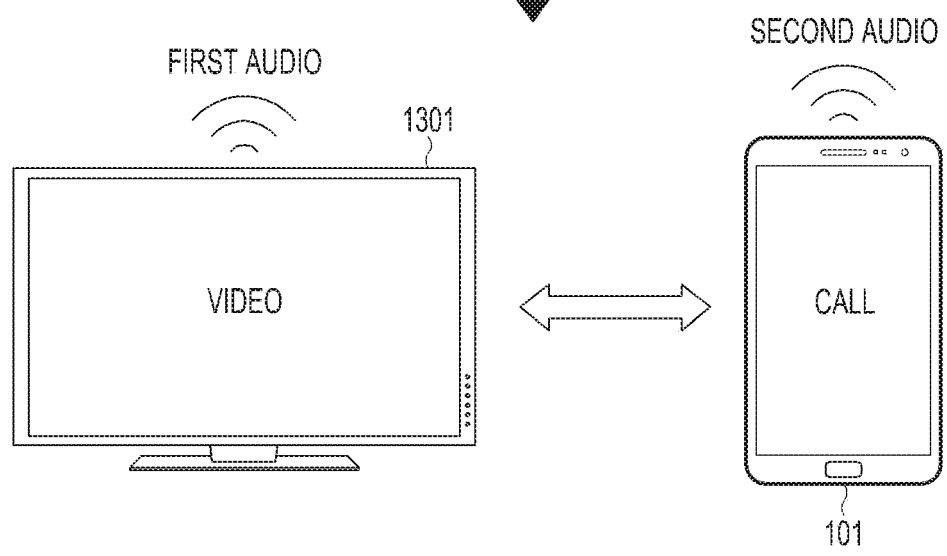

FIGS. 13A and 13B illustrate an electronic device and an external device connected with the electronic device according to an embodiment of the present disclosure.

Referring to FIGS. 13A and 13B, it may be assumed that the electronic device 101 and the external device 1301 are connected with each other. According to an embodiment of the present disclosure, the electronic device 101 and the external device 1301 may be connected via mirroring. The external device 1301 may receive data from the electronic device 101 under the control of the electronic device 101 and display the data of the electronic device 101, e.g., images. Referring to FIG. 13A, it may be assumed that the electronic device 101 is running a media-related application and is thus displaying a video. Since the external device 1301 is mirrored with the electronic device 101, the video displayed through the screen of the electronic device 101 may be displayed through the screen of the external device 1301. Here, the electronic device 101 may control the external device 1301 so that audio related to the video, i.e., the first audio, is output through the audio output device included in the external device 1301. For example, the processor 120 may transmit the video data related to the video and the first audio related to the video to the external device 1301. Further, the processor 120 of the electronic device 101 may perform an operation of controlling the video, e.g., playing the video data and first audio included in the video. Alternatively, the first audio may be simultaneously output through the respective audio output devices of the external device 1301 and the electronic device 101.

FIG. 13B shows an example in which the electronic device 101 receives a call while playing a video. When receiving a call, the electronic device 101 may control the display 160 to display an execution screen of the phone-related application. Assuming that audio by the phone-related application is the second audio, the electronic device 101 may output the second audio through the audio output device included in the electronic device 101, e.g., the embedded speaker 182. Further, the electronic device 101 may control the external device 1301 mirrored with the electronic device 101 to steadily display the video without displaying the execution screen of the phone-related application. Here, the processor 120 of the electronic device 101 may control the output path of the first audio and the output path of the second audio so that the first audio is output through the audio output device of the external device 1301 displaying the video, and the second audio is output through the audio output device (e.g., the embedded speaker 182) of the electronic device 101.

As another example, in response to a user input, the electronic device 101 may play music by running the media-related application, and an external speaker (e.g., a Bluetooth speaker) may be in connection with the electronic device 101. The processor 120 may control the electronic device 101 to output the audio of the music to be played through the external speaker connected with the electronic device 101. As described above, the electronic device 101 may receive a text message while outputting the audio of the playing music through the external speaker. In response to the reception of the text message, the processor 120 may generate a notification to indicate the reception of the text message. The notification may include an audio, e.g., a notification voice or a sound effect. When the audio of the playing music is steadily output through the external speaker, the processor 120 may determine that the audio related to the notification is output through an output device other than the external speaker. For example, the notification-related audio may be output through an earphone connected with the electronic device 101 or the embedded speaker 182.

According to an embodiment of the present disclosure, as shown in FIG. 13B, it may be assumed that a third audio is generated while the first audio is output through the audio output device of the external device 1301, and the second audio is output through the embedded speaker 182. The processor 120 may determine an output device to output the third audio or the output path of the third audio based on the audio-related information on the third audio. The application related to the third audio, like the phone-related application, may be output through the embedded speaker 182, and the embedded speaker 182 may be assumed to support a stereo function by which different sounds may be output through two channels, respectively. In such case, the processor 120 may divide the embedded speaker 182 into two channels (e.g., a left channel and a right channel) to output the second audio and the third audio. Since the embedded speaker 182 supports such stereo function, the processor 120 may control the electronic device 101 so that the second audio by the phone-related application is output through one of the channels while the third audio is output through the other channel.

According to an embodiment of the present disclosure, when the external audio output device supports a stereo function by which different sounds may be output through two or more channels, respectively, the processor 120 may control the external audio output device so that the audios by different applications may be output through the channels, respectively.

FIGS. 14A, 14B, 14C, 14D, and 14E illustrate audio-related information according to various embodiments of the present disclosure.

FIG. 14A is a Table 1401 showing an example of audio-related information for each type of event generated in the electronic device 101. FIG. 14A illustrates audio-related information for each of a call-related event, notification/alarm-related event, and system-related event.

Referring to FIG. 14A, Table 1401, the priority per output device for the audio by the call-related event is as follows: The Bluetooth speaker comes first, the earphone second, the USB/HDMI audio device third, and the embedded speaker 182 last. The priority per output device for the audio by the notification/alarm-related event is as follows: the earphone comes first, the Bluetooth speaker second, the USB/HDMI audio device third, and the embedded speaker 182 last. Although the embedded speaker 182 comes last in priority, it may output audio simultaneously with other output devices. For example, the embedded speaker 182 may output the audio by the notification/alarm-related event simultaneously with the earphone, Bluetooth speaker, and the USB/HDMI audio device. The priority per output device for the audio by the system-related event is as follows: the earphone comes first, the USB/HDMI audio device second, the Bluetooth speaker third, and the embedded speaker 182 last.

For example, it may be assumed that the Bluetooth speaker is not in connection with the electronic device 101. When a call-related event (e.g., reception of a call) occurs, the processor 120 may determine the output device to output the audio (e.g., a ring tone) by the call-related event by referring to the priority per output device for the call-related event. When the Bluetooth speaker that comes first in priority is not connected with the electronic device 101, the processor 120 may output the audio by the call-related event through the earphone that comes next in priority.

For example, it may be assumed that the earphone is connected with the electronic device 101. Upon detecting a notification/alarm-related event (e.g., occurrence of a notification or alarm), the processor 120 may determine the output device to output the audio by the notification/alarm-related event by referring to the priority per output device for the notification/alarm-related event in Table 1401. When the earphone that comes first in priority is connected with the electronic device 101, the processor 120 may output the audio by the notification/alarm-related event through the earphone that comes first in priority. As described above, while outputting the audio by the notification/alarm-related event through the earphone, the processor 120 may detect a system-related event. Referring to Table 1401, for the priority per output device for the system-related event, the earphone comes first. Since the primary output device for the notification/alarm-related event is the same as the primary output device for the system-related event, the audio by the notification/alarm-related event and the audio by the system-related event may end up being simultaneously output through the earphone. In order to prevent such situation, the processor 120 may determine an audio through the earphone of the audio by the notification/alarm-related event and the audio by the system-related event.

According to an embodiment of the present disclosure, the processor 120 may determine the audio to be output through the earphone according to the priority per event for the earphone. For example, regarding the priority per event for the earphone, when the priority for the notification/alarm-related event is higher than the priority for the system-related event, the processor 120 may determine that the audio by the notification/alarm-related event is output through the earphone. Further, the processor 120 may determine that the audio by the system-related event is output through the USB/HDMI audio device that comes second in priority for the system-related event based on Table 1401.

Alternatively, the processor 120 may identify the importance of each of the notification/alarm-related event and the system-related event and determine the audio to be output through the earphone based on a result of the identification. For example, when the notification/alarm-related event has a higher importance over the system-related event, the processor 120 may control the electronic device 101 so that the audio by the notification/alarm-related event is output through the earphone. As set forth above, the importance of each event may vary depending on user inputs or the type of the application associated with each event. The importance per event may be previously stored in the memory 130 and may be designated by a user input.

FIG. 14B is a Table 1402 showing the priority of applications per audio output device of audio-related information.

Referring to FIG. 14B, Table 1402, the priority per application for the Bluetooth speaker is as follows: the music/video-related application comes first, the phone-related application second, the notification/alarm-related application third, and the system-related application comes last. The priority per application for the earphone is as follows: the phone-related application comes first, the music/video-related application second, the notification/alarm-related application third, and the system-related application comes last. The priority per application for the USB/HDMI audio device is as follows: the music/video-related application comes first, the phone-related application second, the notification/alarm-related application third, and the system-related application comes last. The priority per application for the embedded speaker 182 is as follows: the phone-related application comes first, the notification/alarm-related application second, the music/video-related application third, and the system-related application comes last.

For example, when the primary output device for the notification/alarm-related application is the same as the primary output device for the system-related application, the processor 120 may determine the output device to output the audio by each application by referring to Table 1402. Referring to the priority per application for the earphone shown in Table 1402, the notification/alarm-related application comes third, and the system-related application comes last. Accordingly, the processor 120 may determine that the audio by the notification/alarm-related application is output through the earphone.

For example, it may be assumed that the Bluetooth speaker is in connection with the electronic device 101. Upon detecting an event for running the music/video application, the processor 120 may control the electronic device 101 so that the audio by the music/video application is output through the Bluetooth speaker. Further, when the phone-related application or notification/alarm-related application is run while the audio by the music/video application is output through the Bluetooth speaker, the processor 120 may output the audio through other output devices than the Bluetooth speaker, e.g., the earphone, USB/HDMI audio device, or the embedded speaker 182, by referring to Table 1402.

FIG. 14C is a Table 1403 showing the priority of output devices per audio sound-quality. In FIG. 14C, it may be assumed that the audio sound quality increases with higher levels.

Referring to FIG. 14C, Table 1403, the audio corresponding to LV 5 may be output primarily through the Bluetooth speaker, secondarily through the USB/HDMI speaker, tertiarily through the earphone, and quaternarily through the embedded speaker 182. The audio corresponding to LV 4 may be output primarily through the earphone, secondarily through the Bluetooth speaker, tertiarily through the USB/HDMI audio device, and quaternarily through embedded speaker 182. The audio corresponding to LV 3 may be output primarily through the USB/HDMI audio device, secondarily through the earphone, tertiarily through the Bluetooth speaker, and the quaternarily through the embedded speaker. The audio corresponding to LV 2 may be output primarily through the embedded speaker, secondarily through the earphone, tertiarily through the USB/HDMI audio device, and quaternarily through the Bluetooth speaker.

According to an embodiment of the present disclosure, the processor 120 may determine the quality of audio by each application. For example, it may be assumed that the music-related application plays a music file. When the music file has a sound quality of LV 4, the processor 120 may control the electronic device 101 to output the audio according to the playback of the music file through the earphone. When the music file has a sound quality of LV 5, the processor 120 may control the electronic device 101 to output the audio according to the playback of the music file through the Bluetooth speaker, and when the music file has a sound quality of LV 3, the processor 120 may control the electronic device 101 to output the audio according to the playback of the music file through the USB/HDMI speaker.

For example, it may be assumed that the earphone is not connected with the electronic device 101 and thus the audio with the LV 4 sound quality (hereinafter, the first audio) is output through the Bluetooth speaker. Further, the electronic device 101 may be assumed to output an audio with the LV 5 sound quality (hereinafter, the second audio). Referring to Table 1403 showing the per-sound quality priority of output devices, the processor 120 may determine that the second audio is output through the Bluetooth speaker that comes first in priority. However, since the first audio is already output through the Bluetooth speaker, the first audio and the second audio may be simultaneously output through the Bluetooth speaker. In order to prevent such result, the processor 120 may re-determine the output path of the first audio and the second audio. For example, assuming that the better sound quality, the higher priority the output device has, the processor 120 may determine that the second audio, i.e., the LV 5 audio, is output through the Bluetooth speaker that comes first in priority. Further, the processor 120 may determine that the first audio, i.e., the LV 4 audio, is output through the USB/HDMI audio device that comes third in priority or the embedded speaker 182 that comes fourth in priority.

FIG. 14D is a Table 1404 showing the priority of per-audio genre output device.

Referring to FIG. 14D, Table 1404, the audio of the classical genre may be output primarily through the Bluetooth speaker, secondarily through the USB/HDMI speaker, tertiarily through the embedded speaker 182, and quaternarily through the earphone. The audio of the rock genre may be output primarily through the earphone, secondarily through the Bluetooth speaker, tertiarily through the USB/HDMI audio device, and quaternarily through embedded speaker 182. The audio of the dance genre may be output primarily through the USB/HDMI audio device, secondarily through the earphone, tertiarily through the Bluetooth speaker, and the quaternarily through the embedded speaker 182. The audio of the ballad genre may be output primarily through the earphone, secondarily through the embedded speaker, tertiarily through the USB/HDMI audio device, and quaternarily through the Bluetooth speaker.

According to an embodiment of the present disclosure, the processor 120 may determine the genre of audio by each application. For example, it may be assumed that the music-related application plays a music file. When the genre of music file is rock or ballad, the processor 120 may control the electronic device 101 to output the audio according to the playback of the music file through the earphone. When the genre of music file is classical, the processor 120 may control the electronic device 101 to output the audio according to the playback of the music file through the Bluetooth speaker, and when the genre of music file is dance, the processor 120 may control the electronic device 101 to output the audio according to the playback of the music file through the USB/HDMI speaker.

For example, it may be assumed that the first audio of the rock genre is output through the earphone that comes first in the priority per output device for each genre. Further, it may be assumed that the second audio of the ballad genre is to be output. Referring to Table 1404, the earphone comes first in the priority per output device for the ballad genre, and the processor 120 may determine the earphone as the output device of the second audio. However, since the first audio is already output through the earphone, the processor 120 may determine the audio to be output through the earphone of the first audio and the second audio. For example, when the priority for the earphone increases as the sound quality gets better, the processor 120 may determine that the audio with better sound quality of the first audio and the second audio is output through the earphone.

According to an embodiment of the present disclosure, the processor 120 may determine that the audio with a higher per-genre priority for the earphone is output through the earphone. For example, regarding the per-genre priority, when the priority of ballad is higher than the priority of rock, the processor 120 may determine that the second audio corresponding to ballad is output through the earphone, and the first audio corresponding to rock is output through an output device other than the earphone, e.g., the Bluetooth speaker, the USB/HDMI audio device, or the embedded speaker 182. Here, the processor 120 may determine whether the output devices are available in the order from an output device with a higher priority to an output device with a lower priority, and when a corresponding output device is available, may designate the first audio corresponding to rock to the corresponding output device.

FIG. 14E is a Table 1405 showing an example of audio-related information per application. FIG. 14E shows audio-related information regarding each of a music-related application, a video-related application, and a game-related application.

Referring to FIG. 14E, Table 1405, the priority per output device for the audio by the music-related application is as follows: the Bluetooth speaker comes first, the earphone second, the USB/HDMI audio device third, and the embedded speaker 182 last. The priority per output device for the audio by the video-related application is as follows: the earphone comes first, the Bluetooth speaker second, the USB/HDMI audio device third, and the embedded speaker 182 last. Although the embedded speaker 182 comes last in priority, it may output audio simultaneously with other output devices. For example, the embedded speaker 182 may output the audio by the video-related application simultaneously with the earphone, Bluetooth speaker, and the USB/HDMI audio device. The priority per output device for the audio by the game-related application is as follows: the earphone comes first, the USB/HDMI audio device second, the Bluetooth speaker third, and the embedded speaker 182 last.

For example, it may be assumed that the Bluetooth speaker is not in connection with the electronic device 101. When the music-related application runs, the processor 120 may determine the output device to output the audio by the music-related application by referring to the priority per output device for the music-related application. When the Bluetooth speaker that comes first in priority is not connected with the electronic device 101, the processor 120 may output the audio by the music-related application through the earphone that comes next in priority.

For example, it may be assumed that the earphone is connected with the electronic device 101. When the video-related application runs, the processor 120 may determine the output device to output the audio by the video-related application by referring to the priority per output device for the video-related application. When the earphone that comes first in priority is connected with the electronic device 101, the processor 120 may output the audio by the video-related application through the earphone that comes first in priority. As described above, when the audio by the video-related application is output through the earphone, the game application may be run. Referring to Table 1405, for the priority per output device for the game-related application, the earphone comes first. Since the primary output device for the video-related application is the same as the primary output device for the game-related application, the processor 120 may determine the application to output audio through the earphone of the video-related application and the game-related application.

According to an embodiment of the present disclosure, the processor 120 may store the Tables 1401 to 1405 shown in FIGS. 14A, 14B, 14C, 14D, and 14E in an audio output DB (not shown) included in the memory 130. According to an embodiment of the present disclosure, the processor 120 may store the audio-related information obtained whenever installing each application or whenever running each application in the form of the Tables 1401 to 1405 shown in FIGS. 14A, 14B, 14C, 14D, and 14E. The processor 120 may create a Table 1401 according to the patterns of the output devices outputting the audio by each application or audio-related information and store the information in the memory 130. Further, the processor 120 may create the Tables 1402 to 1404 shown in FIGS. 14B, 14C, and 14D according to the applications where audio has been generated from each output device, the genre or sound quality pattern of the audio output from each output device and store the information in the memory 130. The processor 120 may create or update the Tables 1401 to 1405 according to the output device of the audio by the application whenever running the application.

For example, the processor 120 may record the names of applications per audio, sound quality or genre of the audio output through the base station in the memory 130. The processor 120 may determine the application related to the audio output most through the Bluetooth speaker as the primary application for the Bluetooth speaker. Further, the processor 120 may determine the genre or sound quality of the audio output most through the Bluetooth speaker as the primary genre or sound quality for the Bluetooth speaker and update the Tables 1402 to 1404 shown in FIGS. 14B, 14C, and 14D stored in the memory 130.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FP- GAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

According to an embodiment of the present disclosure, there is provided a machine-readable storage medium recording a program to execute a method for transmitting a signal including A/V data to a first external electronic device through a first communication module, while connected with the first external electronic device, generating data or a signal unrelated to the A/V data or receiving the data or the signal unrelated to the A/V data from an external electronic device other than the first external electronic device, and providing the audio or the video through a display or an embedded sound device based on at least a portion of the data or the signal unrelated to the A/V data or transmitting the at least a portion of the data or the signal unrelated to the A/V data to a second external electronic device through a second communication module.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). The embodiments disclosed herein are proposed for description and understanding of the disclosed technology and do not limit the scope of the present disclosure. Accordingly, the scope of the present disclosure should be interpreted as including all changes or various embodiments based on the technical spirit of the present disclosure.

As is apparent from the foregoing description, according to the present disclosure, there may be provided an electronic device and a method for adjusting the output path of audio for output through an audio output device included in the electronic device or an audio output device functionally connected with the electronic device.

While the present disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication module;
   a processor electrically connected with the communication module; and
   a memory electrically connected with the processor, wherein the memory is configured to store instructions executed to configure the processor to:
   run a first application and generate a first audio signal related to the first application,
   determine an output device of the first audio signal related to the first application based on a priority of output devices for the first application,
   if it is determined that the output device of the first audio signal is an external device connected the communication module, transmit the first audio signal to the external device through the communication module, and
   while the first audio signal is outputted through the external device, if a second audio signal related to a second application is generated, determine an output device of the second audio signal different from the external device.

2. The electronic device of claim 1, wherein the processor is configured to:
   if the second audio signal is a call signal, determine an embedded sound device as the output device of the second audio signal.

3. The electronic device of claim 2, wherein the processor is further configured to:
   if a user input for accepting the call signal is received, control the embedded sound device to output a call voice.

4. The electronic device of claim 1,
   wherein the communication module includes a first communication module using a first communication protocol or a second communication module using a second communication protocol, and wherein the first communication protocol and the second communication protocol support communication within about 100 meters.

5. The electronic device of claim 1, wherein the second audio signal is an alarm or a notification.

6. A method for outputting an audio signal by an electronic device, the method comprising:
running a first application and generating a first audio signal related to the first application;
determining an output device of the first audio signal related to the first application based on a priority of output devices for the first application;
if it is determined that the output device of the first audio signal is an external device connected a communication module of the electronic device, transmitting the first audio signal to the external device through the communication module; and
while the first audio signal is outputted through the external device, if a second audio signal related to a second application is generated, determining an output device of the second audio signal, different from the external device.

7. The method of claim 6, wherein the determining the output device of the second audio signal comprises:
if the second audio signal is a call signal, determining an embedded sound device as the output device of the second audio signal.

8. The method of claim 7, further comprising:
if a user input for accepting the call signal is received, controlling the embedded sound device to output a call voice.

9. The method of claim 6,
wherein the communication module includes:
a first communication module using a first communication protocol, or
a second communication module using a second communication protocol different from the first communication protocol, and wherein the first communication protocol and the second communication protocol support communication within about 100 meters.

10. The method of claim 6, wherein the second audio signal is an alarm or a notification.

11. At least one non-transitory machine-readable storage medium for storing a computer program of instructions configured to be readable by at least one processor for instructing the at least one processor to execute a computer process for performing a method for outputting an audio signal by an electronic device, the method comprising:
running a first application and generating a first audio signal related to the first application;
determining an output device of the first audio signal related to the first application based on a priority of output devices for the first application;
if it is determined that the output device of the first audio signal is an external device connected a communication module of the electronic device, transmitting the first audio signal to the external device through the communication module; and
while the first audio signal is outputted through the external device, if a second audio signal related to a second application is generated, determining an output device of the second audio signal different from the external device.

* * * * *